United States Patent
Eguchi et al.

(10) Patent No.: US 8,107,116 B2
(45) Date of Patent: Jan. 31, 2012

(54) IMAGE FORMING APPARATUS

(75) Inventors: Munetoshi Eguchi, Hachioji (JP);
Tomohiro Suzuki, Nishitokyo (JP); Yuji Tamura, Hachioji (JP); Tetsuya Ishikawa, Hachioji (JP); Hiroyasu Nishimura, Hachioji (JP); Tomoya Ogawa, Hachioji (JP); Fumikage Uchida, Asaka (JP); Nao Moromizato, Hachioji (JP); Masayuki Yasukaga, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1364 days.

(21) Appl. No.: 11/714,876

(22) Filed: Mar. 7, 2007

(65) Prior Publication Data

US 2007/0269138 A1   Nov. 22, 2007

(30) Foreign Application Priority Data

May 18, 2006   (JP) .................................. 2006-138669
May 18, 2006   (JP) .................................. 2006-138670

(51) Int. Cl.
*G06K 9/20* (2006.01)

(52) U.S. Cl. ...................... 358/1.16; 358/1.18; 382/305

(58) Field of Classification Search ................ 358/1.16, 358/505, 524, 1.12, 1.18; 710/5; 382/305
See application file for complete search history.

(56) References Cited

U.S. PATENT DOCUMENTS

| | | | | |
|---|---|---|---|---|
| 4,928,253 A * | 5/1990 | Yamauchi et al. | ............ | 345/539 |
| 6,992,788 B2 * | 1/2006 | Fujiwara | ...................... | 358/1.15 |
| 7,130,072 B2 * | 10/2006 | Suzuki et al. | ................. | 358/1.15 |
| 2002/0118894 A1 * | 8/2002 | Morimoto et al. | ............ | 382/305 |
| 2002/0159656 A1 * | 10/2002 | Matsuki et al. | ................. | 382/305 |
| 2003/0048951 A1 * | 3/2003 | Rengakuji et al. | ............ | 382/232 |
| 2004/0015621 A1 * | 1/2004 | Tanaka | ............................. | 710/22 |
| 2004/0049608 A1 * | 3/2004 | Sakurai | ............................. | 710/5 |
| 2004/0130750 A1 * | 7/2004 | Ushida et al. | ................. | 358/1.16 |
| 2005/0206956 A1 * | 9/2005 | Hagiwara | ..................... | 358/1.18 |

FOREIGN PATENT DOCUMENTS

| | | |
|---|---|---|
| EP | 1 424 590 A1 | 6/2004 |
| EP | 1 475 656 A1 | 11/2004 |
| JP | 5-91341 | 4/1993 |
| JP | 05-143406 | 6/1993 |
| JP | 08-194812 | 7/1996 |
| JP | 2000-278463 | 10/2000 |
| JP | 2002-140286 | 5/2002 |
| JP | 2003-179732 | 6/2003 |
| JP | 2003-198815 | 7/2003 |

(Continued)

OTHER PUBLICATIONS

Japanese Office Action dated May 2, 2008.

(Continued)

*Primary Examiner* — King Poon
*Assistant Examiner* — Allen H Nguyen
(74) *Attorney, Agent, or Firm* — Finnegan, Henderson, Farabow, Garrett & Dunner, L.L.P.

(57) ABSTRACT

An image processing apparatus comprises a memory; a store control section to divide and store image data in plural vacant memory regions in the memory; and an image administrating information registering section to register each divided image data divided by the store control section by correlating position information of each divided image data in the image data before dividing the image data with storing position information of each divided image data indicating a storing memory region.

12 Claims, 33 Drawing Sheets

FOREIGN PATENT DOCUMENTS

| | | |
|---|---|---|
| JP | 2003-198816 | 7/2003 |
| JP | 2003-198818 | 7/2003 |
| JP | 2003-281078 | 10/2003 |
| WO | WO 2004/049052 A1 | 6/2004 |
| WO | WO 2005/012994 A1 | 2/2005 |

OTHER PUBLICATIONS

European Search Report dated Aug. 19, 2008.
Japanese Office Action dated Jun. 19, 2008.

* cited by examiner

FIG. 15

| | | | |
|---|---|---|---|
| NUMBER OF DMA CHANNELS | 3 | | ~61 |
| NUMBER OF LINE BLOCKS | 4 | | ~62 |
| DMA Ch1 INFORMATION | H_Start_Pointer1 | A 1 Pixel | ⎫ |
| DMA Ch2 INFORMATION | H_Start_Pointer2 | A 2 Pixel | ⎬ 64 |
| DMA Ch3 INFORMATION | H_Start_Pointer3 | A 3 Pixel | ⎭ |
| 1ST LINE BLOCK INFORMATION | V_Start_Pointer1 | B 1 Line | ⎫ |
| 2ND LINE BLOCK INFORMATION | V_Start_Pointer2 | B 2 Line | ⎬ 66 |
| 3RD LINE BLOCK INFORMATION | V_Start_Pointer3 | B 3 Line | |
| 4TH LINE BLOCK INFORMATION | V_Start_Pointer4 | B 4 Line | ⎭ |

MEMORY LAYOUT BEFORE STORAGE INTO THE HDD

MEMORY LAYOUT AFTER READING FROM THE HDD

IMAGE FORMING APPARATUS

CROSS-REFERENCE TO RELATED APPLICATION

This application is based on Japanese Patent Application No. 2006-138669 filed on May 18, 2006, and Japanese Patent Application No. 2006-138670 filed on May 18, 2006 in Japanese Patent Office, the entire content of which is hereby incorporated by reference.

BACKGROUND OF THE INVENTION

The present invention relates to an image processing apparatus that divides image data into a plurality of blocks for processing, particularly to a technique of storing image data in discontinuous memory regions, further to a technique of DMA (Direct Memory Access) transfer of image data between a plurality of memory regions and a storage device.

In an image processing apparatus such as a photocopier that handles image data in units of page, the one-page image data having been read is normally stored in a continuous memory region, with consideration given to processing ease and processing speed.

In one of the image processing apparatuses having been disclosed, to ensure high speed compression/expansion of the image data, one-page image data is divided into a plurality of regions, and a separate compression/expansion device is provided for each region to perform processing (e.g., Unexamined Japanese Patent Application Publication No. 5-91341).

A technique for DMA (Direct Memory Access) transfer of the divided image data to a memory or the like is disclosed in the information processing apparatus, wherein a CPU (Central Processing Unit) produces the descriptor information wherein the information (e.g., start address and number of transfer bites) required for DMA transfer of one divided region is described in a line for a plurality of divided regions. The DMA controller refers to this descriptor information sequentially from the leading edge, and sequentially executes a plurality of DMA transfer steps (e.g., Unexamined Japanese Patent Application Publication No. 2002-140286). In this apparatus, a plurality of DMA transfer steps are automatically carried out by the DMA controller according to the descriptor information. This eliminates the possibility of an interrupt occurring to the CPU at every completion of the DMA transfer for each divided region, and reduces CPU processing loads.

In another technique that has been disclosed, when two DMA controllers (e.g., data write/read side) accesses one and the same memory, a pause bit is incorporated in the descriptor information referred to by the DMA controller and the transfer operation is suspended temporarily, so that the alternate operation of two DMA controllers is performed (e.g., Unexamined Japanese Patent Application Publication No. 2003-281078).

In the method of storing one-page image data in a continuous memory region, even if the size requirements can be satisfied when all the vacant regions are added together, processing cannot be started until one continuous region is obtained. This has reduced the productivity of the apparatus. For example, when a system memory is shared by the work area for execution of software and the image data storage region, the memory region tends to be fragmented due to the differences in the size of the region to be used or the time of releasing. This makes it difficult to ensure a large continuous region for image data storage (e.g., about 4M-byte region for A4-sized monochromatic sheet).

In the meantime, if arrangement is made in such a way that a continuous region stays resident for the exclusive purpose of image data storage, then a memory region for the maximum page size and the minimum compression rate must stay resident. This structure will reduce the utilization efficiency.

In the aforementioned technique disclosed in the Unexamined Japanese Patent Application Publication No. 5-91341, image data is divided into a plurality of regions, and a process of compression/expansion is applied to each of the divided regions. However, the compressed image data must be stored in the continuous region in the final stage. Thus, this technique also fails to solve the aforementioned problem.

The method of using descriptor information for DMA transfer of the divided image data into a memory or the like is effective to reduce the CPU load. However, the conventional descriptor information is designed for sequential execution of a plurality of DMA transfer steps by one DMA channel or is built to perform alternate operation of two DMA controllers. Thus, such a conventional method fails to provide effective transfer of the image data divided into a plurality of blocks through simultaneous and parallel operation of a plurality of DMA channels.

The object of the present invention is to solve the aforementioned problems and to provide an image processing apparatus capable of storing the divided image data into discrete vacant regions, and an image processing apparatus capable of effective transfer of the divided image data using a plurality of DMA channels.

Incidentally, to store a large amount of image data, the image data stored in the memory is compressed, and is transferred and stored in a storage device such as a hard disk apparatus. For example, the image data outputted from the compressor is once re-stored in a buffer region in the memory, and the image data is then DMA-transferred from this buffer region to the hard disk apparatus.

Further, in an image processing apparatus (e.g., Unexamined Japanese Patent Application Publication No. 2003-179732), one-page image data is divided into a plurality of blocks, and DMA transfer of the image data from the memory to the hard disk apparatus is carried out for each division. In another image processing apparatus (e.g., Unexamined Japanese Patent Application Publication No. 2003-198815), the amount of DMA transfer for each operation and the size of the buffer region are controlled in response to the size of the continuous region that can be stored in a hard disk apparatus.

As described above, when a plurality of DMA transfer steps are to be performed, a DMA descriptor table is utilized in order to reduce the processing load of the CPU1 (Central Processing Unit) resulting from the interrupt occurring for each completion of the DMA transfer. The DMA descriptor table contains the DMA transfer start address and number of transfer bites described in a line for a required number of operation steps. The CPU produces a DMA descriptor table, and the DMA controller refers to this DMA descriptor table sequentially from the leading edge so that a plurality of DMA transfer steps are executed sequentially in an automatic mode.

In the method of storing one-page image data in a continuous memory region, even if the size requirements can be satisfied when all the vacant regions are added together, processing cannot be started until one continuous region is obtained. This has reduced the productivity of the apparatus. For example, when a system memory is shared by the work area for execution of software and the image data storage region, the memory region tends to be fragmented due to the differences in the size of the region to be used or the time of releasing. This makes it difficult to ensure a large continuous region for image data storage (e.g., about 4M-byte region for A4-sized monochromatic sheet).

In the meantime, if arrangement is made in such a way that a continuous region stays resident for the exclusive purpose of image data storage, then a memory region for the maximum page size and the minimum compression rate must stay resident. This structure will reduce the utilization efficiency.

It will be beneficial if image data is stored in the discrete memory regions present in the system memory. However, collective management of all the information on the head address and size of these memory regions is essential to store image data in a plurality of discrete memory regions.

When the DMA transfer of the image data of the discrete memory regions into a hard disk apparatus or the like is to be performed, the transfer operation must be separated into several steps. Thus, the DMA descriptor table is preferably employed.

This requires creation of a DMA descriptor table as well as the information for the management of a plurality of discrete memory regions present in the CPU. This will increase the CPU processing loads for the creation of such data, as well as the memory size to store such information, with the result that memory utilization efficiency is reduced.

The second object of the present invention is to solve these problems and to provide an image processing apparatus which, using a plurality of discrete memory regions, can reduce CPU processing loads involved in producing the administrating information for storage of image data, and the administrating information for DMA transfer of image data between a plurality of memory regions and storage device, as well as the memory size for storing such administrating information.

SUMMARY OF THE INVENTION

At least one of the above first objects can be attained by the following image processing apparatus reflecting an aspect of the present invention.

The image processing apparatus is characterized to comprises:

a memory;

a store control section to divide and store image data in plural vacant memory regions in the memory; and an image administrating information registering section to register each divided image data divided by the store control section by correlating position information of each divided image data in the image data before dividing the image data with storing position information of each divided image data indicating a storing memory region.

Further, the above second object can be attained by the following image processing apparatus reflecting an aspect of the present invention.

The image processing apparatus is characterized to comprises:

a memory;

a memory region acquiring section to acquire a memory region to store image data from one or two or more vacant memory regions in the memory and to produce a memory administrating table to register information regarding the acquired memory region;

a store controlling section to divide and store the image data in a memory region registered in the memory administrating table by referring the memory administrating table produced by the memory region acquiring section;

a storage device capable of storing image data; and a DMA transfer section to conduct DMA transfer for image data between the memory and the storage device by referring a table for DMA transfer in which the content of DMA transfer of plural times can be described;

wherein the memory region acquiring section produces the memory administrating table with the same data structure as the table for DMA transfer such that the DMA transfer section can refer the memory administrating table as the table for DMA transfer.

BRIEF DESCRIPTION OF THE DRAWING

FIG. 15 is an explanatory diagram showing an example of the script file wherein the DMA channel is assigned on a permanent basis;

DETAILED DESCRIPTION OF THE PREFERRED EMBODIMENT

Figure 1:
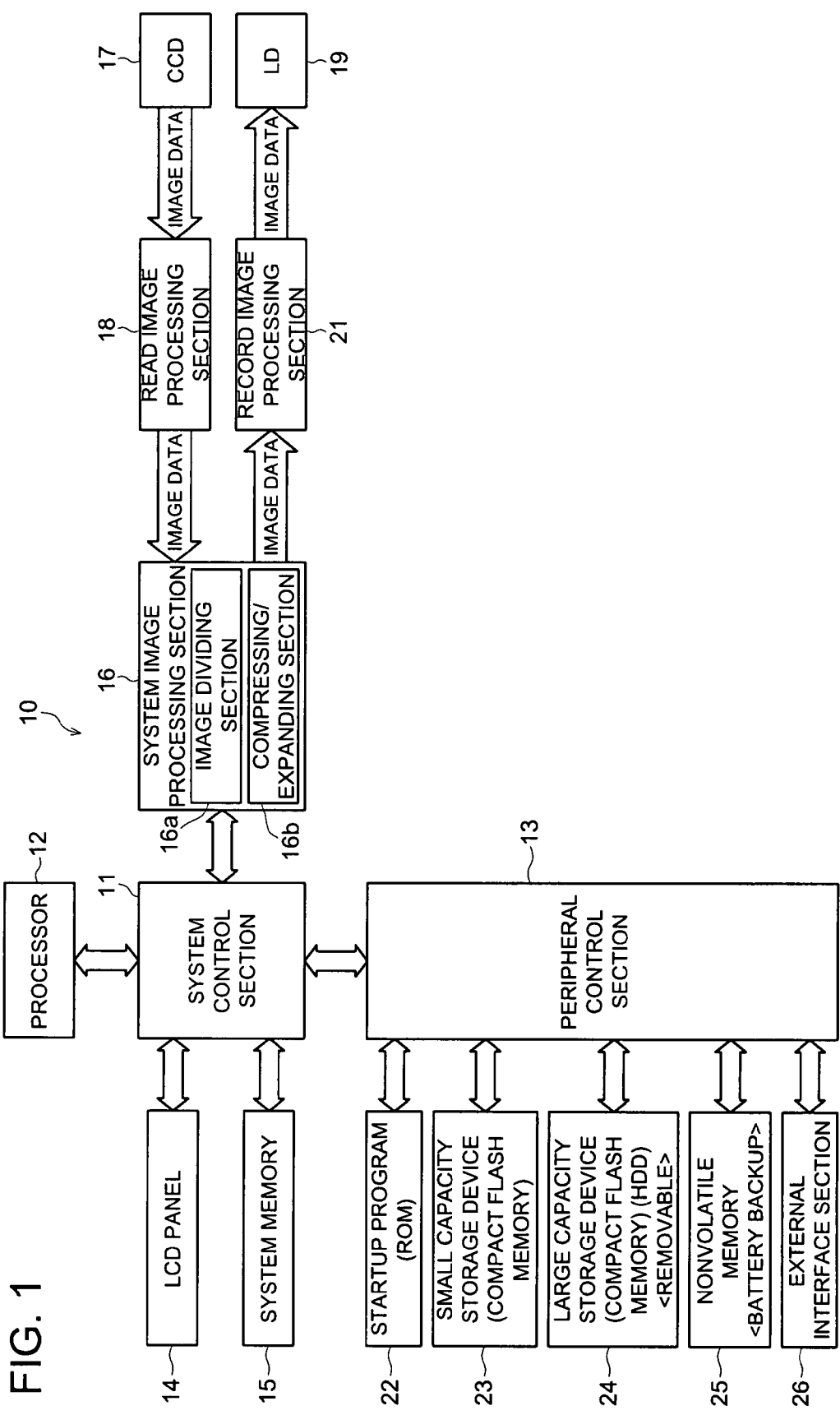
FIG. 1 is a block diagram representing the schematic structure of an image processing apparatus as an embodiment of the present invention.

Hereinafter, preferable embodiments of the present invention are explained, however, the present invention is not limited to these preferable embodiments.

Firstly, preferable image processing apparatus to attain the above objects is explained.

(1-1) An image processing apparatus is characterized to comprises:

a memory;

a store control section to divide and store image data in plural vacant memory regions in the memory;

an image administrating information registering section to register each divided image data divided by the store control section by correlating position information of each divided image data in the image data before dividing the image data with storing position information of each divided image data indicating a storing memory region.

According to the above embodiment, image data are divided and stored in plural vacant memory regions and information to read the divided image data stored in the plural vacant memory regions with correlation to the image data before the dividing is registered. The position information in the image data before the dividing may be a block number, for example, if the image data are divided into N blocks, or may be a position in a coordinate of the image data. The storing position information may be information capable of recognizing the storing position of the image data, such as address information in the memory region and a pointer to a memory administrating table registering address information and size information of the memory region.

(1-2) An image processing apparatus is characterized to comprises:

an image processing section to divide image data into plural divided image data;

a memory to store the image data divided by the image processing section;

a memory administrating table to administrate regions in the memory;

a control section to store the image data divided by the image processing section in the memory by referring the memory administrating table; and an image administrating information registering section to register attribute information of the image data in an image administrating table when the control section stores the image data in the memory.

According to the above embodiment, the image processing section divides image data into plural divided image data, and the control section recognizes vacant memory region by referring the memory administrating table and stores the divided image data in the vacant memory region. Further, the image administrating information registering section registers attribute information of the image data when the control section stores the image data in the memory. For example, information to correlate the image data stored separately in the plural vacant memory regions with the originally successive image data is registered as the attribute information.

(1-3) An image processing apparatus is characterized to comprises:

an image processing section to divide image data into plural divided image data;

a memory to store the image data divided by the image processing section;

a memory administrating table producing section to acquire one or two or more vacant memory regions to store the image data divided by the image processing section from the memory and to produce a memory administrating table to register information regarding the acquired memory region; and a control section to store the image data divided by the image processing section in the memory by referring the memory administrating table.

According to the above embodiment, the image processing section divides image data into plural divided image data and the memory administrating section acquires one or two or more vacant memory regions to store the divided image data and produces a memory administrating table to register the position and the size of the acquired region. The control section recognizes the position and the size of the vacant memory region by referring the memory administrating table produced by the memory administrating section and stores the divided image data in the vacant memory region.

(1-4) The image processing apparatus described in (1-3) is characterized to further comprise an image administrating information registering section to register attribute information of the image data in an image administrating table in an image administrating table when the control section stores the image data in the memory.

In the above embodiment, the image administrating information registering section registers attribute information of the stored image data in an image administrating table when the control section stores the image data in the memory. For example, information to correlate the image data stored separately in the plural vacant memory regions with the originally successive image data is registered as the attribute information.

(1-5) The image processing apparatus described in (1-3) or (1-4) is characterized in that the position information and the size information of the acquired memory regions are registered in the memory administrating table.

(1-6) The image processing apparatus described in (1-2), (1-4) or (1-5) is characterized in that the attribute information regarding the image data includes position information of the divided image data in the image data before the dividing and storing position information indicating the memory region storing the image data.

The position information in the image data before the dividing may be a block number, for example, if the image data are divided into N blocks, or may be a position in a coordinate of the image data. The storing position information may be information capable of recognizing the storing position of the image data, such as address information in the memory region and a pointer to a memory administrating table registering address information and size information of the memory region.

(1-7) The image processing apparatus described in (1-6) is characterized in that the storing position information is link information between the memory administrating table and the image administrating table.

In the above embodiment, the storing position of the image data can be recognized by referring a linked position in the memory administrating table.

(1-8) The image processing apparatus described in (1-6) is characterized in that the attribute information regarding the image data further includes job information and page information with regard to the image data.

According to the above embodiment, in the image administrating table, image data involving plural jobs can be administrated separately for each page. That is, image data involving at which position in which page of which job can be recognized by referring a position stored in the memory.

(1-9) The image processing apparatus described in any one of (1-2) to (1-8) is characterized in that information regarding a memory region and attribute information regarding image data stored in the memory region are correlated and registered in the memory administrating table.

According to the above embodiment, by referring the memory administrating table, the kind of the attribute of image data stored in each memory region registered in the memory administrating table can be recognized. For example, if job information, page information, position information in a page are registered as attribute information, image data stored in a desired position in a desired page of a desired job can be read out from the memory only by referring the memory administrating table. With this, it is not necessary to refer the memory administrating table at the time of reading out.

(1-10) The image processing apparatus described in any one of (1-2) to (1-9) is characterized in that the control section conducts DMA transfer for image data between the image processing section and the memory by referring a script file describing information regarding the DMA transfer and the memory administrating table.

In the above embodiment, the DMA transfer is conducted automatically in accordance with the script file.

(1-11) The image processing apparatus described in (1-10) is characterized in that in the script file, a dividing state of image data by the image processing section is described.

In the above embodiment, since the dividing state of image data can be recognized by referring the script file, it is possible to separate plural divided image data into divided units and to automatically transfer them through the DMA transfer. Especially, different from the case that the script file is described in a form of list in the pressing order, plural DMA channels can be worked simultaneously for the plural divided image data.

(1-12) The image processing apparatus described in (1-10) or (1-11) is characterized in that the image processing section divides image data into plural blocks of M divisions in the horizontal direction and N divisions in the vertical direction (M and N are a positive integer and at least one of M and N is 2 or more), in the script file, information capable of recognizing the start position and the number of pixels in the horizontal direction of each block and the start position and the number of pixels in the vertical direction of each block and the number of usable DMA channels are described.

In the above embodiment, from the start position and the number of pixels in the horizontal direction of each block and the start position and the number of pixels in the vertical direction of each block, the position of each block in the image data and the size can be recognized. Therefore, parameters of the image processing side (source side) in connection with the DMA transfer can be set. Further, from the information indicating the number of usable DMA channels, it is possible to judge how to assign these DMA channels for transfer of each block. Incidentally, parameters of the memory side (destination side) in connection with the DMA transfer can be recognized from the memory administrating table.

(1-13) The image processing apparatus described in any one of (1-10) to (1-12) is characterized in that DMA channels to handle each block are fixedly assigned.

In the above embodiment, in the case that, for example, image data are transferred by using the same number of DMA channels with the dividing number in the horizontal direction, DMA channels are fixedly assigned for divided regions in each horizontal direction. A process to determine to assign which DMA channel to which block can be simplified.

(1-14) The image processing apparatus described in any one of (1-10) to (1-12) is characterized in that a vacant DMA channel which has completed a DMA transfer is assigned to conduct a next DMA transfer.

In the above embodiment, without fixedly assigning which DMA channel to transfer which block, ever time when a DMA channel becomes a vacant state after completing a DMA transfer, the DMA is instructed to conduct a next DMA transfer. In this case, the relationship between the dividing number in the horizontal direction and the number of DMA channels may be optional, the dividing number in the horizontal direction may be less than, equal to, or larger than the number of DMA channels.

(1-15) The image processing apparatus described in any one of (1-10) to (1-14) is characterized in that every time when the DMA transfer has been completed, attribute information regarding image data transferred through DMA transfer is registered sequentially in the image administrating table.

In the above embodiment, with the timing that DMA transfer has been completed, the attribute information regarding the image data transferred through the DMA transfer is registered sequentially in the image administrating table.

(1-16) The image processing apparatus described in any one of (1-1) to (1-15) is characterized in that the memory is administrated by a memory administrating system to conduct acquisition and release of a memory region.

(1-17) The image processing apparatus described in any one of (1-1) to (1-16) is characterized in that the divided image data are compressed for each divided unit and the compressed image data are stored in the memory.

In the image processing apparatus of the present invention, image data is stored after having been divided into a plurality of vacant regions. This structure eliminates the need of preparing a large continuous region capable of storing all the image data, and allows the image data to be stored utilizing the discrete vacant region. This arrangement ensures effective use of the memory even if the system memory used in the software work area, for example, is shared to store the image data.

When image data is transferred to the memory and is stored therein, and the attribute information on the image data being stored is registered in the image administrating table, the image data divided in several blocks can be read as restructured to the status prior to division, by referring to this image administrating table. Further, this arrangement reduces the CPU processing loads as compared to the case where the image administrating table is produced by the CPU.

Further, transfer of the image data is controlled by referring to the memory administrating table for management of the memory region. This ensures efficient storage of the image data in the discontinuous vacant region. Especially when it is necessary to the vacant region for storing the image data and to produce the memory administrating table for the memory region having been prepared, referring to this memory administrating table ensures efficient acquisition of the information on the memory region for storage of the image data, from memory administrating table.

When a script file is used to control DMA transfer of the image data between the image processing section and memory, the image data having been divided can be transferred effectively using a plurality of DMA channels, without depending on the help of a CPU.

(2-1) An image processing apparatus is characterized to comprises:

a memory;

a memory region acquiring section to acquire a memory region to store image data from one or two or more vacant memory regions in the memory and to produce a memory administrating table to register information regarding the acquired memory region;

a store controlling section to divide and store the image data in a memory region registered in the memory administrating table by referring the memory administrating table produced by the memory region acquiring section;

a storage device capable of storing image data; and a DMA transfer section to conduct DMA transfer for image data between the memory and the storage device by referring a table for DMA transfer in which the content of DMA transfer of plural times can be described;

wherein the memory region acquiring section produces the memory administrating table with the same data structure as the table for DMA transfer such that the DMA transfer section can refer the memory administrating table as the table for DMA transfer.

According to the above embodiment, the data structure of the memory administrating table to administrate plural memory regions acquired to store image data is made the same with the data structure of the table for DMA transfer to transfer through DMA transfer image data stored separately in plural memory regions to a storage device. With this, the memory administrating table can be used also as the table for DMA transfer. Accordingly, in comparison with the case of producing them independently, the processing load of CPU involving a table production and a memory capacity to store tables can be reduced.

Incidentally, the memory administrating table needs to register a start address of memory regions and regions sizes and the table for DMA transfer needs to register a transfer start address, a transfer size and a transfer flag. Further, in the case of transferring image data stored in the memory regions through DMA transfer to the storage device, the transfer start address coincides with the start address of the memory region, and the transfer size coincides with the region size. Therefore, all information to be registered in the memory administrating table resides in the table for DMA transfer. Then, by coinciding the data structure of the memory administrating table with the data structure of the table for DMA transfer. The memory administrating table can be used also as the table for DMA transfer. Incidentally, in the case that specific information is needed for the memory administrating table, bits unused in the table for DMA transfer may be used.

(2-2) An image processing apparatus is characterized to comprises:

a memory;

a memory region acquiring section to acquire a memory region to store image data from one or two or more vacant memory regions in the memory and to produce a memory administrating table to register information regarding the acquired memory region;

a store controlling section to divide and store the image data in a memory registered in the memory administrating table by referring the memory administrating table produced by the memory region acquiring section; and a DMA transfer section to conduct DMA transfer for image data between the memory and a storage device capable of storing image data by referring a table for DMA transfer in which the content of DMA transfer of plural times can be described;

wherein the memory region acquiring section produces the memory administrating table with the same data structure as the table for DMA transfer such that the DMA transfer section can refer the memory administrating table as the table for DMA transfer.

(2-3) The image processing apparatus described in (2-1) or (2-2) is characterized in that when reading out image data stored in the storage device and storing the image data in the memory, the memory region acquiring section acquires a memory region to store the image data from one or two or more vacant memory regions in the memory and produces a memory administrating table to register information regarding the acquired memory region, and the DMA transfer section conducts DMA transfer for image data from the storage device to the memory by referring the memory administrating table as the table for DMA transfer.

In the above embodiment, in the case of reading out image data stored in the storage device and storing the image data in the memory, the memory administrating table is also used as the table for DMA transfer.

(2-4) The image processing apparatus described in any one of (2-1) to (2-3) is characterized in that the image processing apparatus further comprises:

an image administrating information registering section to register attribute information regarding stored image data in an image administrating table when the store controlling section stores the image data in the memory.

In the above embodiment, when the store controlling section stores image data in the memory, the image administrating information registering section registers attribute information regarding the stored image data in an image administrating table. For example, information to correlate the divided image data stored in plural memory regions with original image data is registered as the attribute information.

(2-5) The image processing apparatus described in any one of (2-1) to (2-4) is characterized in that the image processing apparatus further comprises:

an image dividing section to divide image data into plural blocks, wherein the store controlling section stores the image data divided into the plural blocks by the image dividing section in plural memory regions registered in the memory administrating table.

In the above embodiment, regardless of the size of memory region to be acquired, image data are divided into plural blocks and the divided image data are stored separately in plural memory regions registered in the memory administrating table. For example, it may be a case that one block is stored separately in plural memory regions or a case that image data of anther block are stored an remainder region of a memory region storing an block.

(2-6) The image processing apparatus described in (2-5) is characterized in that the image data stored in the plural memory regions are memorized in the storage device as serial image data before being divided in plural blocks by the image dividing section and block identifying information to identify the serial image data for each block divided by the image dividing section is memorized with correlation to the serial image data.

In the above embodiment, the image data stored separately in the plural memory regions are memorized in the storage device with correlation to original serial image data and information to identify the serial image data for each block divided by the image processing section is memorized. For example, in the case that image data compressed for each block are memorized in the storage device with correlation to serial image data, image data can be expanded for each block by referring the block identifying information.

(2-7) The image processing apparatus described in (2-6) is characterized in that when the serial image data are read out from the storage device, the read out serial image data are divided and stored separately in plural memory regions in the memory, and image administrating information indicating that image data of each block included in the serial image data are stored in which memory region, is produced based on the block identifying information.

In the above embodiment, when the image data are read out from the storage device and stored again in plural memory regions, image administrating information indicating that image data of which block are stored in which memory region, is produced. In a process to read out image data stored in plural memory regions, image data stored separately in plural memory regions are connected in the original state by referring the image administrating information, whereby a page can be reproduced.

(2-8) The image processing apparatus described in any one of (2-5) to (2-7) is characterized in that image data are compressed or expanded for a unit of the blocks and the compressed image data are stored in the memory.

(2-9) The image processing apparatus described in any one of (2-1) to (2-8) is characterized in that the memory is administrated by a memory administrating system for conducting acquisition and release of memory regions.

In the image processing apparatus of the present invention, the memory administrating table for management of a plurality of memory regions used for storage of the image data is designed to have the same data structure as that of the DMA table for DMA transfer of the image data between a plurality of memory regions and storage device. This arrangement allows the memory administrating table to be used also as a DMA transfer table. This cuts down CPU processing loads for table creation and the memory size for table storage, as compared to the cases where various tables are produced separately, with the result that processing efficiency and memory utilization efficiency are enhanced.

Referring to drawings, the following describes the embodiments of the present invention.

Firstly, the first embodiment to attain the first object of the present invention is explained.

FIG. 1 shows the schematic structure of an image processing apparatus 10 as an embodiment of the present invention. The image processing apparatus 10 is an apparatus exemplified by a photocopier equipped with the copying function for reading a document image, forming a duplicated image on the recording paper and outputting the result. It has a major controller containing a system controller 11 for controlling the operations of the entire system, a processor 12 for performing a computation processing function, and a peripheral controller 13 for controlling various peripheral functions.

The system controller 11 is connected with an LCD panel 14, system memory 15 and system image processing section 16, in addition to the processor 12 and peripheral controller 13. The LCD panel 14 receives various operations from the user and displays various operation screen and guide screen. The system memory 15 stores the operation program to be executed by the processor 12, and also provides a region to store the work memory and image data when the operation program is executed by the processor 12.

The system image processing section 16 is connected with a CCD (charge coupled device) 17 as a document image reading device through a read image processing section 18. It is also connected with an LD (Laser Diode) 19 as a laser printer type recording section through the record image processing section 21. The system image processing section 16 is provided with an image divider 16a for dividing one-page image data into a plurality of blocks s and a compressing/expanding section 16b for compression and expansion of the image data.

In the document reading operation, the image data outputted from the CCD 17 is subjected to various image corrections by the read image processing section 18, and is inputted into the system image processing section 16. The image having been inputted in the system image processing section 16 is divided into a plurality of blocks by the image divider 16a, and is compressed by a compressing/expanding section 16b for each block. The image data having been compressed for each block is loaded into the system memory 15 through a system controller 11.

In the process of outputting to a recording sheet, the image data of the system memory 15 is read out by the system controller 11, is inputted into the system image processing section 16, and is decompressed by the compressing/expanding section 16b. Then it is connected back to the original one-page data, and is outputted to the LD 19 through the recorded image processing section 21.

The peripheral controller 13 is connected with a ROM 22 for storing the startup program and others in advance, small capacity storage device 23, large capacity storage device 24, nonvolatile memory 25 and external interface 26. The small capacity storage device 23 stores the control program and general-purpose operating system program. The flash memory is used as a small capacity storage device 23. The starting program in the ROM 22 is executed at the time of starting the apparatus, whereby the program in the small capacity storage device 23 is implemented in the system memory 15, and processor 12 performs processing according to this program.

The large capacity storage device 24 is made up of a hard disk apparatus and others, and is used to store the image data. The nonvolatile memory 25 is used to store various parameters inherent to the apparatus and others. The external interface 26 is connected with the external apparatus by various communication methods, and is used to control communications. For example, the LAN (Local Area Network), USB (Universal Serial Bus) and IEEE 1394 (Institute of Electrical and Electronic Engineers 1394) are used for this connection.

The image forming apparatus 10 has a memory administrating system for controlling acquisition and releasing of the memory region for the system memory 15. The memory administrating system is implemented by the processor 12 for executing the memory administrating program in the control program. In response to the requirements from other programs, the memory administrating system acquires the memory region of the requested size from the system memory 15, and gives it to the program of the request source. Further, when the release instruction for the acquired region has been received from another program, the operation is performed to release the relevant memory region as an unused region (vacant region).

Figure 2:
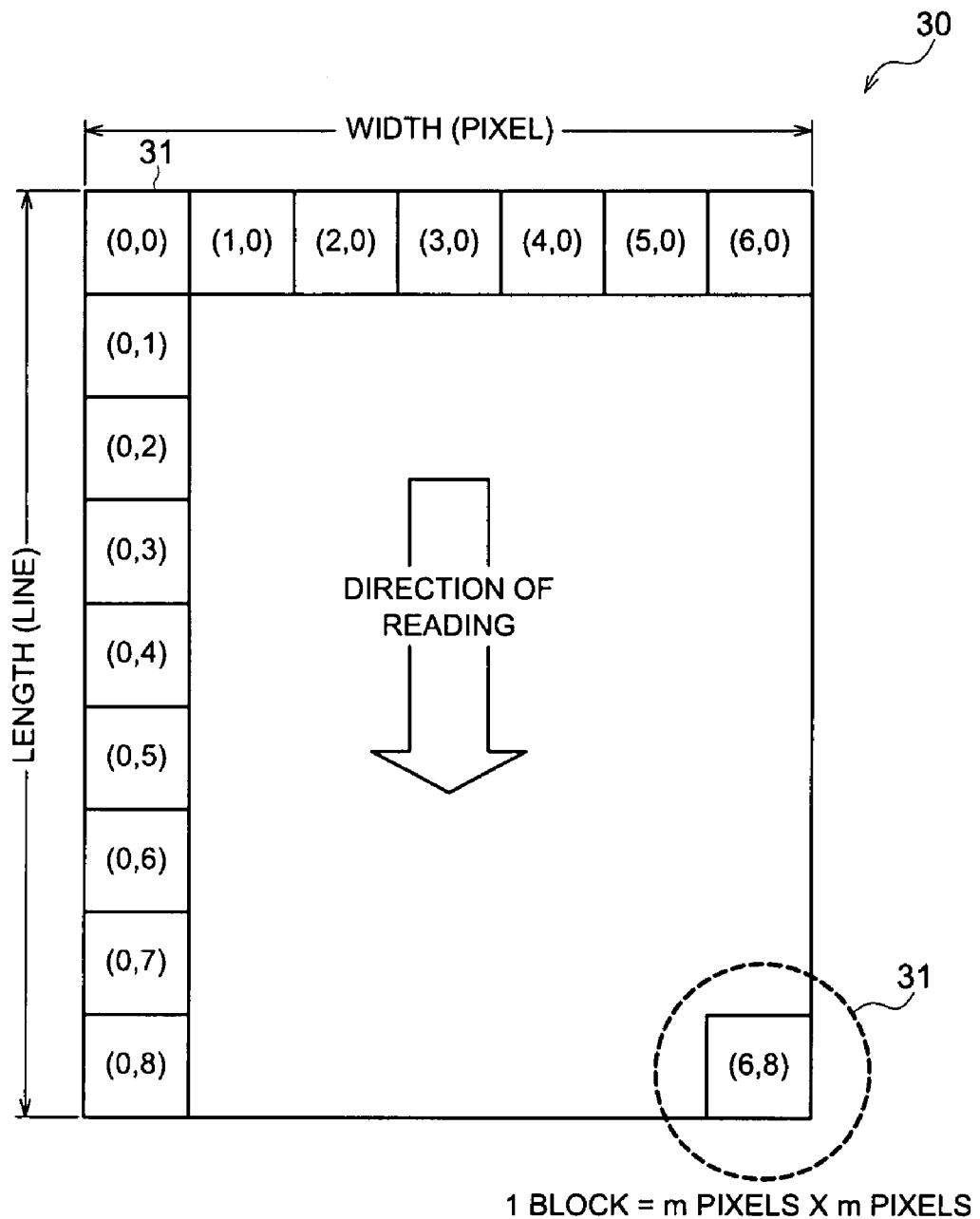
FIG. 2 is an explanatory diagram showing an example of how one-page image data is divided.

FIG. 2 shows an example of how one-page image data is divided by the image divider 16a. The image divider 16a divides the one-page image data 30 into N in the horizontal direction and into M in the vertical direction (wherein "M" and N" denote any positive integers and at least one of them represents 2 or more). Thus, the image data is divided into a plurality of blocks 31. In the example of FIG. 2, the data is divided into seven in the horizontal direction (across the width) corresponding to the direction of reading in units of line, and into nine in the vertical direction (along the length). Thus, the one-page data is divided into 63 blocks. The position of each block in the page is expressed in coordinate information (X, Y). The compressing/expanding section 16b applies a compressing/expanding process in units of divided blocks.

Each block has the same size, and the number of pixels of each block in the horizontal direction and the number of pixels in the vertical direction are set at the same value for the purpose of image rotation or the like. The number of divisions in the horizontal and vertical direction is not restricted to the one shown in FIG. 2. It can be set to any value in response to the compression efficiency, processing efficiency, memory region utilization efficiency.

The following describes the flow of the processes from reading of an one-page document image through storing of that image data into the system memory 15.

Figure 3:
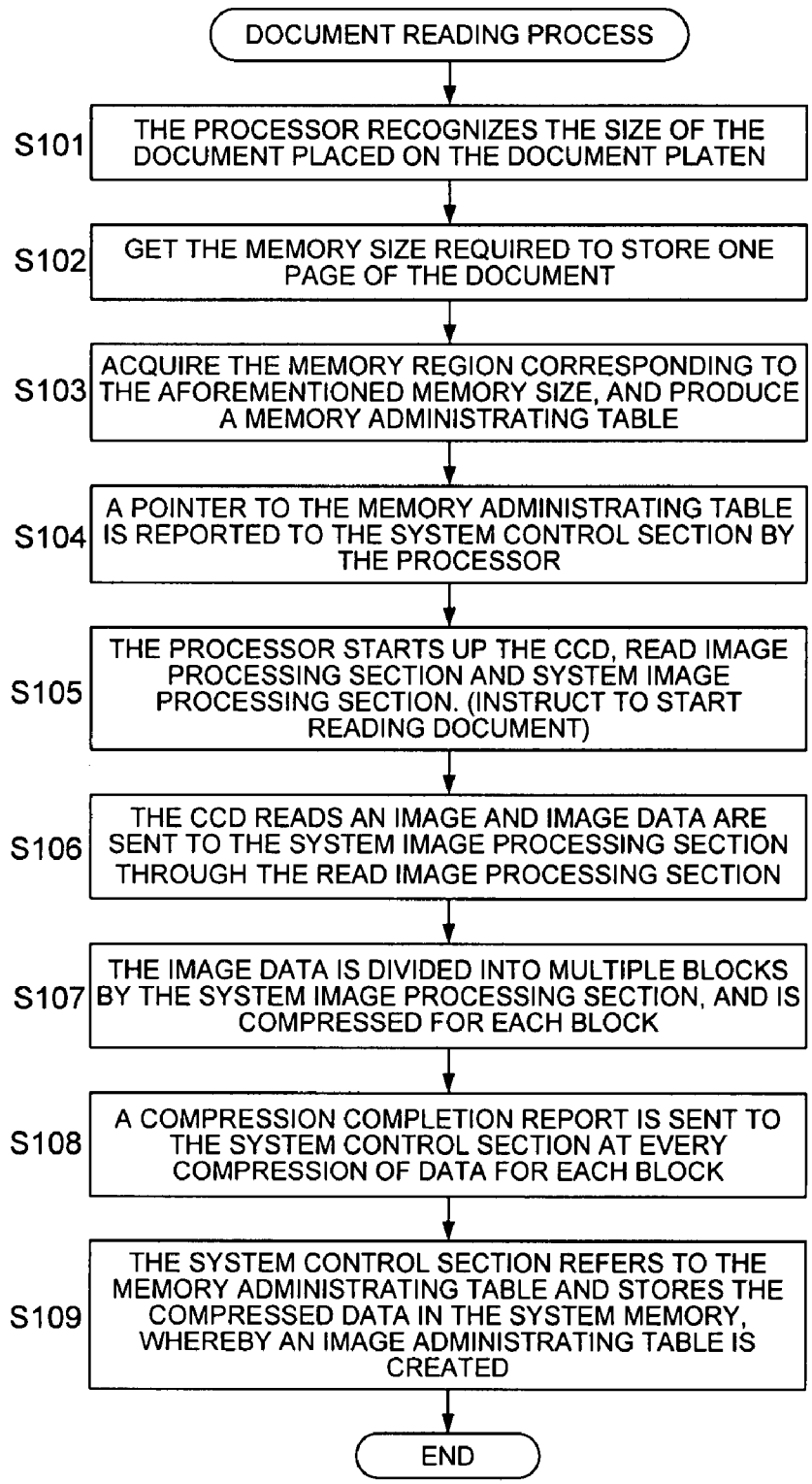
FIG. 3 is a flowchart representing all the reading operations conducted by the image processing apparatus as an embodiment of the present invention.
Figure 4:
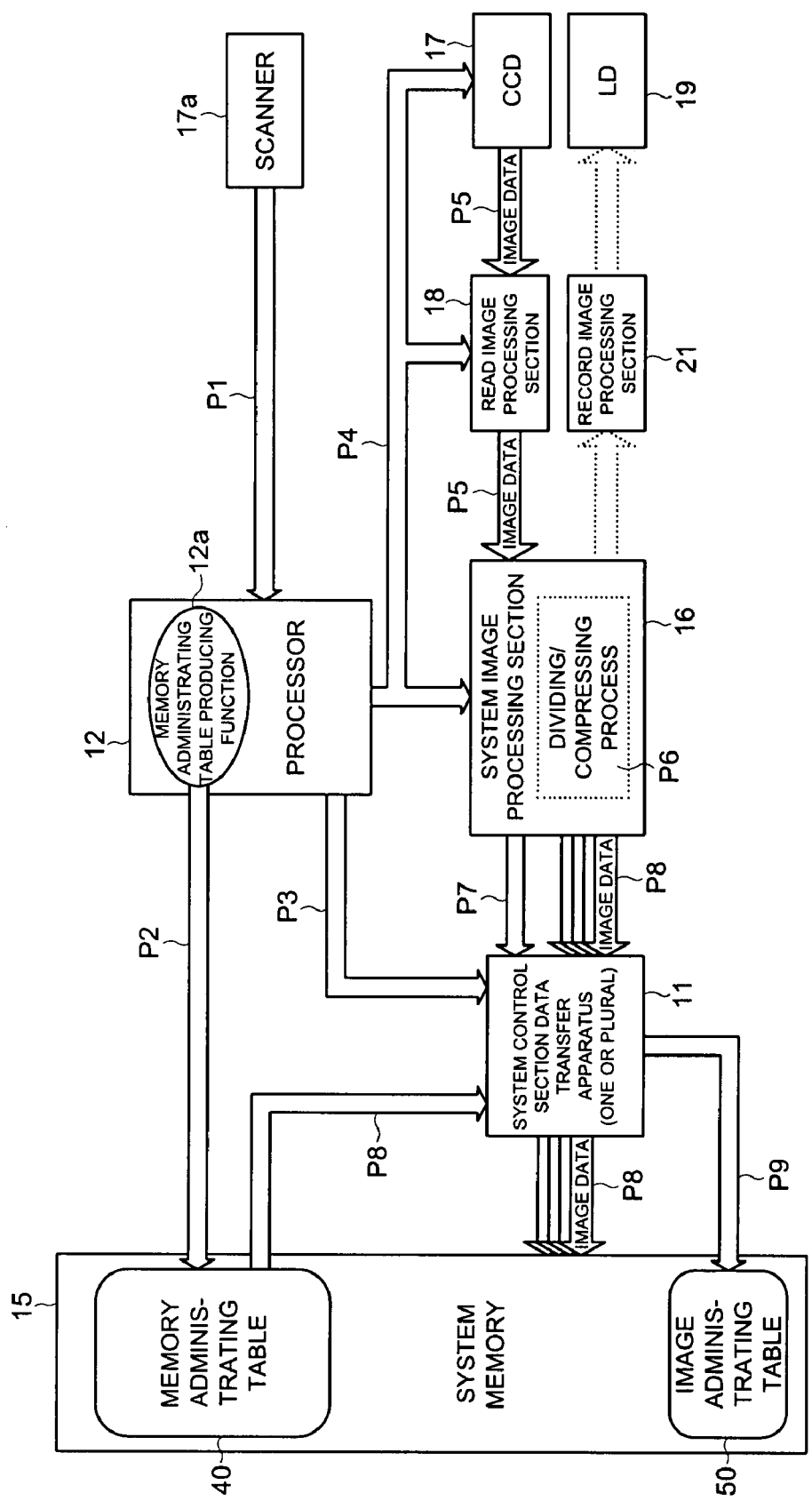
FIG. 4 is an explanatory diagram showing the flow of commands and data in the reading operation given in FIG. 3.

FIG. 3 represents the flow of the process in the reading operations, and FIG. 4 shows the flow of commands and data in that process. When the job is inputted and the Start button (not illustrated) is pressed, the processor 12 identifies the size of the document set on the scanner 17a of FIG. 4 (FIG. 3: Step S101, FIG. 4: P1), and finds the memory size required to store one page of the document (Step S102). Since the image data is stored in a compressed form, the memory size required for the storage of one page vary according to each image. In this phase, the standard memory size for the set document size is found out.

Then the processor 12 recalls the memory administrating table producing function (software module) 12a. The memory administrating table producing function acquires from the system memory 15 the memory region corresponding to the memory size required to store one page of the document. At the same time, the memory administrating table 40 for registering the position and size of the acquired memory region is produced in the (FIG. 3: Step S103 and FIG. 4: P2). If the required memory size cannot be acquired as one continuous vacant region, the required memory region in terms of a total of multiple discrete vacant regions is acquired.

The processor 12 reports information on the produced memory administrating table 40 (address information of the memory administrating table 40) to the system controller 11 (FIG. 3: Step S104, FIG. 4: P3). Then it actuates the CCD 17, the read image processing section 18, and system image processing section 16 so that the document image reading operation starts (FIG. 3: Step S105 and FIG. 4: P4). Then the image data obtained by reading the document image from the CCD 17 is inputted into the read image processing section 18, and is subjected to the process of image correction and others. After that, the image data is transferred to the system image processing section 16 (FIG. 3: Step S106 and FIG. 4: P5).

As shown in FIG. 2, the system image processing section 16 divides the image data inputted from the read image processing section 18, into a plurality of blocks 31, and compresses image data according to each divided block (FIG. 3: Step S107 and FIG. 4: P6). At each completion of image data compression according to block, the system image processing section 16 sends a compression completion report for that block to the system controller 11 (FIG. 3: Step S108 and FIG. 4: P7).

Having received the compression completion report, the system controller 11 refers to the memory administrating table 40, identifies the position and size of the vacant region having been acquired, and stores the compressed image data into this vacant region. Further, the system controller 11 registers the attribute information on the stored image data into the image administrating table 50 of the system memory 15, and serves the function as the image information registration section (FIG. 3: Step S109, FIG. 4: P8/P9). The attribute information includes the information for merging the image data stored in a plurality of discrete vacant regions, into the original continuous image data. The details of the information on the image administrating table 50 will be described later.

As described above, referring to the memory administrating table 40, the system controller 11 automatically transfers and stores the image data into the system memory 15, whereby the processing load of the processor 12 is reduced. Further, the attribute information on the stored image data is registered into the image administrating table 50 by the system controller 11 (image information registration section). This also reduces the load on the processor 12 for processing the creation/registration of the image administrating table 50. Further, at the time of reading, reference is made to the image administrating table 50. This procedure ensures that the image data stored separately in a plurality of discrete vacant regions can be connected into the original one-page image data.

If the size of compressed image data is greater than the standard size, and the vacant region registered in the memory administrating table 40 is insufficient, the system controller 11 requests the processor 12 to get a new memory region. In response to the request, the memory administrating table producing function 12a of the processor 12 acquires a new vacant region from the system memory 15. Then the information on the acquired memory region is additionally registered into the memory administrating table 40.

Figure 5:
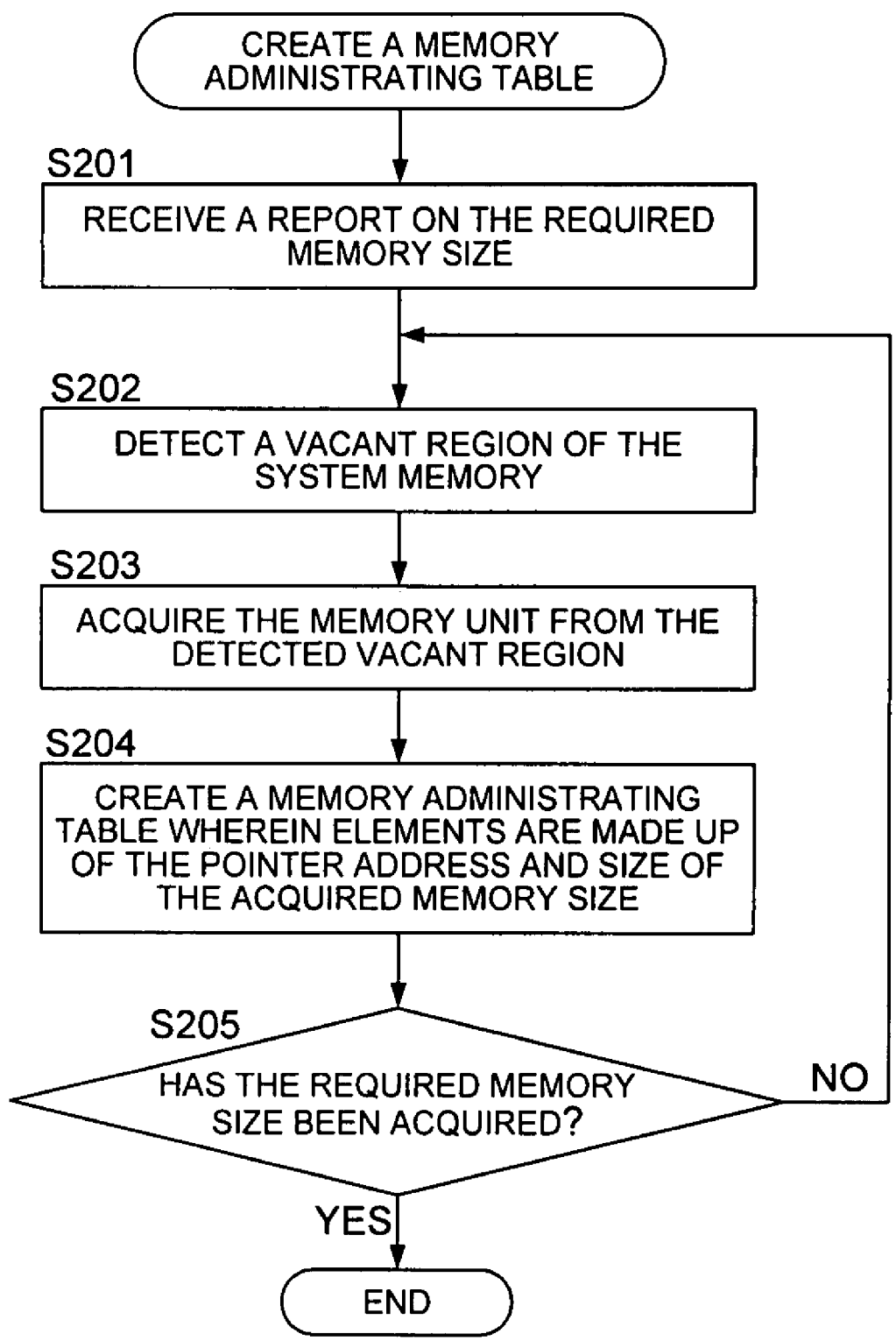
FIG. 5 is a flowchart showing how the memory administrating table is produced.

The following describes the details of the process of producing the memory administrating table 40:

FIG. 5 shows the flow in the process of producing the memory administrating table 40. In response to the report on the memory size to be acquired (Step S201), the memory administrating table producing function 12a starts the operation of acquiring the vacant region corresponding to that memory size. To be more specific, the vacant region in the system memory 15 is detected (Step S202), and the memory unit is acquired from the detected vacant region (Step S203).

For example, if the size of the detected vacant region is smaller than the remaining size as a difference between the memory size having been acquired so far and the required memory size, all the detected vacant regions are acquired as a memory unit. If the size of the detected vacant region is greater than the remaining size, the memory region for the remaining size is acquired from the detected vacant region as a memory unit. If the memory unit is acquired according to the fixed length boundary (e.g., 4 K-byte boundary), then the memory region of the size corresponding to an integral multiple of the fixed length of this boundary is acquired as a memory unit from the start position conforming to this boundary in the detected vacant region.

The system produces the memory administrating table 40 registering the information (unit information) on the pointer address (head address) and size of the memory unit having been acquired in the aforementioned manner (Step S204). If the region for the required memory size cannot be obtained (Step S205: N), the system goes to Step S202, and detects the next vacant region. When the memory unit corresponding to the required memory size (vacant region) is acquired (Step S205: Y), processing completes (END). If the memory unit for the required memory size (vacant region) cannot be acquired, the procedure will end in an error.

Figure 6:
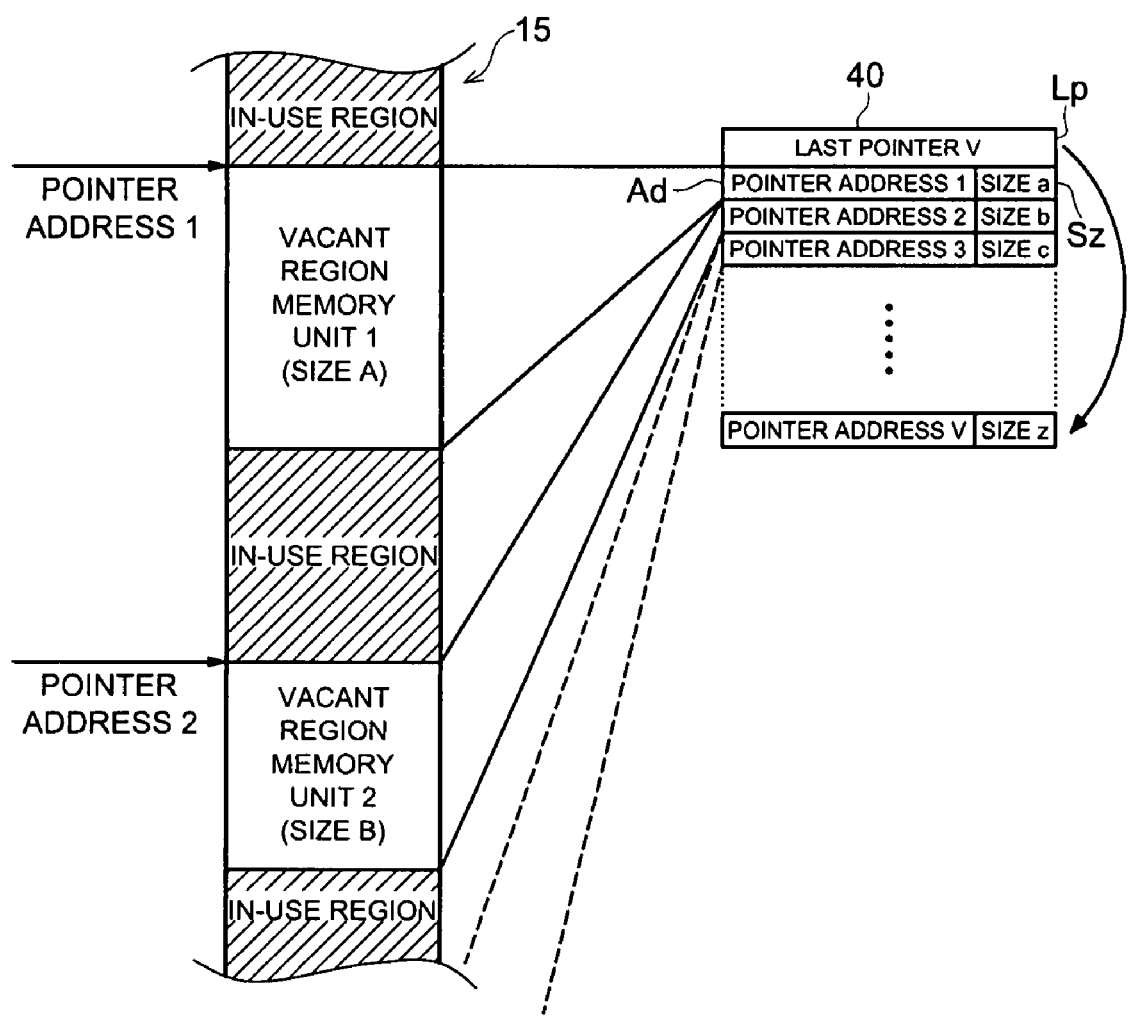
FIG. 6 is an explanatory diagram showing an example of the correspondence between the unoccupied state of the system memory and the memory administrating table.

FIG. 6 shows an example of the correspondence between the unoccupied state of the system memory 15 and the memory administrating table 40 having been produced. The system memory 15 contains the presence of discrete vacant regions. When these discrete vacant regions are added up, the memory unit (vacant region) of the required memory size can be acquired. The memory administrating table 40 registers the unit information including the pointer address (head address) Ad and region size Sz of that memory unit in a form of a list for each of the acquired memory units.

The number of the pieces of unit information registered in the memory administrating table 40 varies according to the occupied status of the system memory 15 or required memory size. Accordingly, the last pointer Lp indicating the end of that memory administrating table 40 is registered in the leading edge of the memory administrating table 40.

The system controller 11 identifies the last unit information of the memory administrating table 40 according to the last pointer Lp. Further, if the image data has such a large size that the amount of memory unit originally acquired as a standard is insufficient and a new memory unit is to be acquired, then the unit information on the newly acquired memory unit can be registered additionally at the end of this memory administrating table 40 by referring to the last pointer Lp. It is also possible to make such arrangements that the addition to the memory administrating table 40 is acquired in another region and the information on the linkage to this region is registered in the memory administrating table 40.

The system produces a memory administrating table 40 wherein the unit information on the memory unit having been acquired in this manner is collectively registered. This arrangement allows the system controller 11 to achieve efficient acquisition of the information on the vacant region used for the storage of image data, by referring to the memory administrating table 40.

In FIG. 6, one memory unit is set for one vacant region. However, one vacant region can be used by being divided for a plurality of memory units. Further, when the size of the memory unit is to be kept constant, the size information Sz need not be registered in the memory administrating table 40. The size information can be registered in another region or can be determined as a permanent size.

Figure 7:
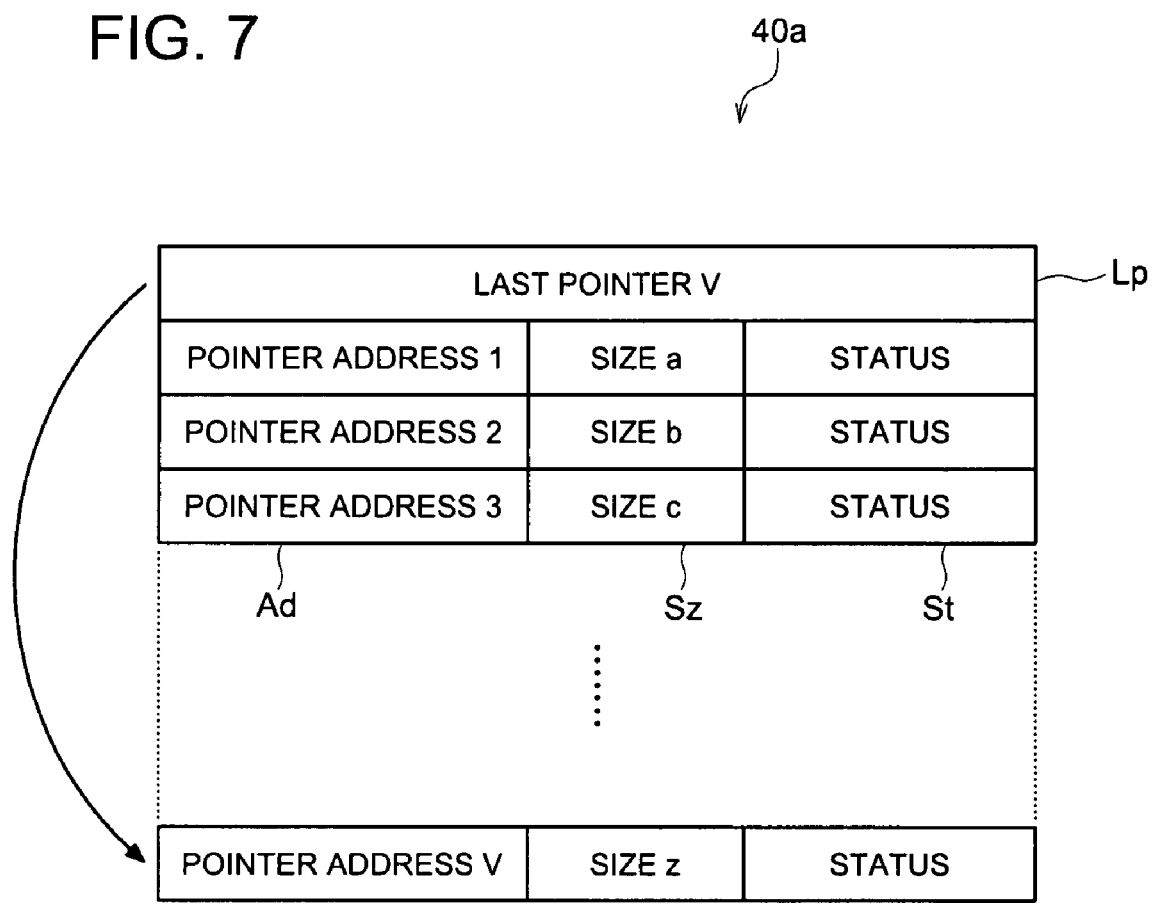
FIG. 7 is an explanatory diagram showing an example of the memory administrating table provided with status information.

FIG. 7 shows an example of the memory administrating table 40a provided with the status information St. The memory administrating table 40a of FIG. 7 is formed based on the assumption that a plurality of data transfer processing sections refer to a common memory administrating table 40a in order to transfer data. To avoid contention, the status information St showing the status of each memory unit is added.

For example, the first status should be defined as the "unused" status (wherein any data transfer processing section may use), the second status as the "in-use" status wherein any one of the data transfer processing sections is in used (image data being transferred), and the third status as the "partially has been used" status (wherein part of the memory unit has been used for storage of image data (transfer has completed at present), but an vacant region remains in the memory unit), and the fourth status as the "has been used" status (wherein the memory unit has no vacant region and this memory unit cannot be used to store new image data).

When the status information St is provided as described above, one and the same memory unit is protected against being used doubly by different data transfer processing sections. Further, the remaining part of the memory used having been used halfway can be used for another transfer operation. This ensures efficient use of the memory.

The following describes the details of the flow in the process of storing the compressed one-block image data in the system memory 15 (corresponding to Step S109 of FIG. 3).

Figure 8:
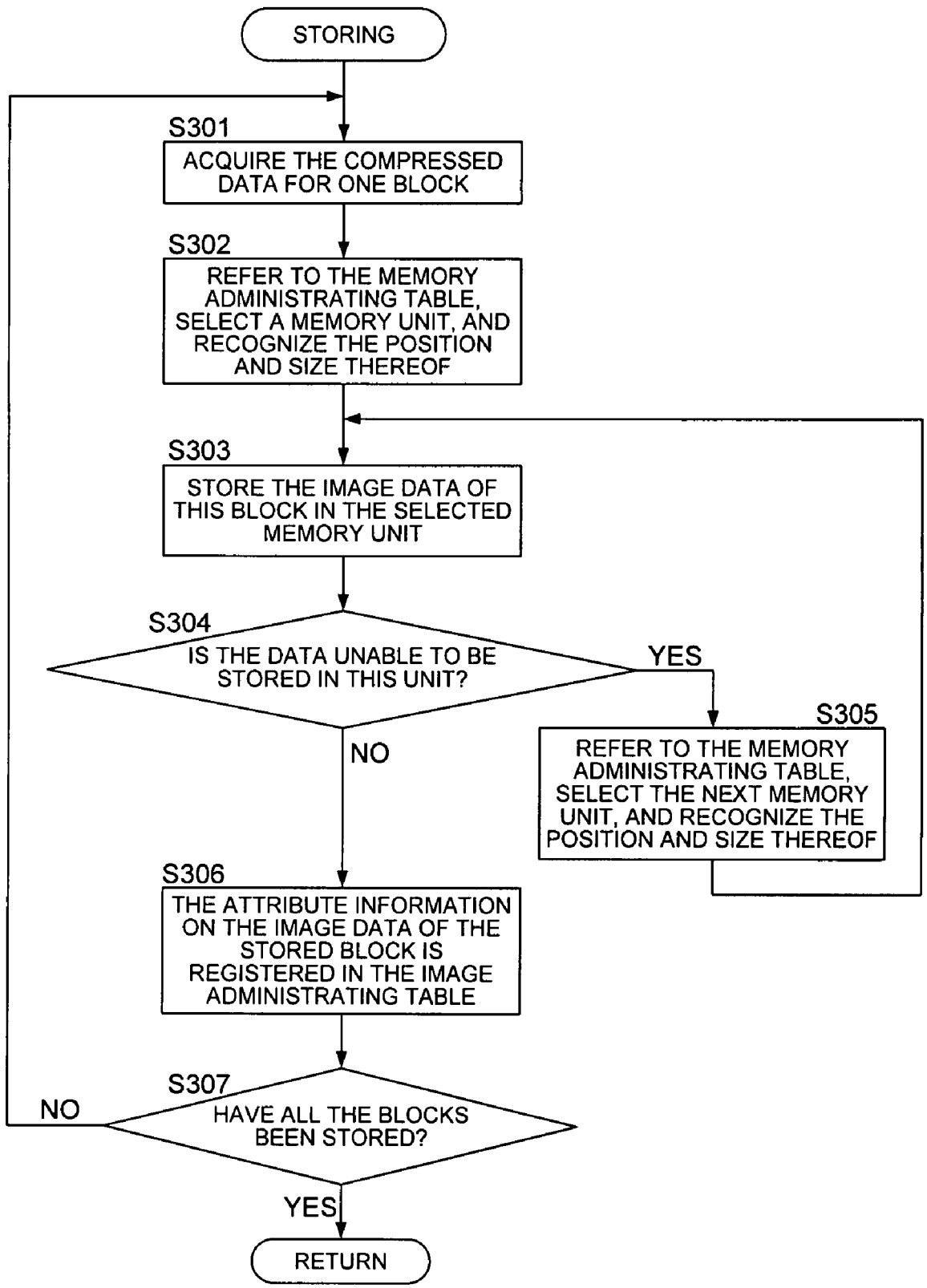
FIG. 8 is a flowchart showing how the 1-block image data compressed by the system image processing section is stored into the system memory.

FIG. 8 shows the flow in the process of storing the compressed one-block image data into the system memory 15. Upon receipt of the compression completion report of the image data for one block from system image processing section 16 (Step S301), the system controller 11 refers to the memory administrating table 40, and selects one of the memory units to identify the position (pointer address) and size of the selected memory unit (Step S302). The image data of the block corresponding to the previous compression completion report is stored in the memory unit (Step S303). The memory unit uses the memory units registered in the memory administrating table 40, starting, for example, from the one located at the leading position sequentially.

If the image data cannot be stored in this memory unit (Step S304: Y), the system refers to the memory administrating table 40, and selects the next memory unit (Step S305). The remaining image data is stored in this memory unit (Step S303).

One or two and more memory units is used. Thus, upon completion of the storage of the one-block image data (Step S304: N), the attribute information on the image data of the block stored this time is registered in the image administrating table 50 (Step S306). If there is a block that is not stored (Step S307: N), the system goes to Step S301, and continues processing of the next block. When the process of storing all the one-page blocks has completed (Step S307: Y), this processing completes (RETURN).

It is also possible to arrange such a configuration that, upon every completion of the storage of image data in one memory unit, the attribute information on the image data stored in the memory unit is registered in the image administrating table 50.

Figure 9:
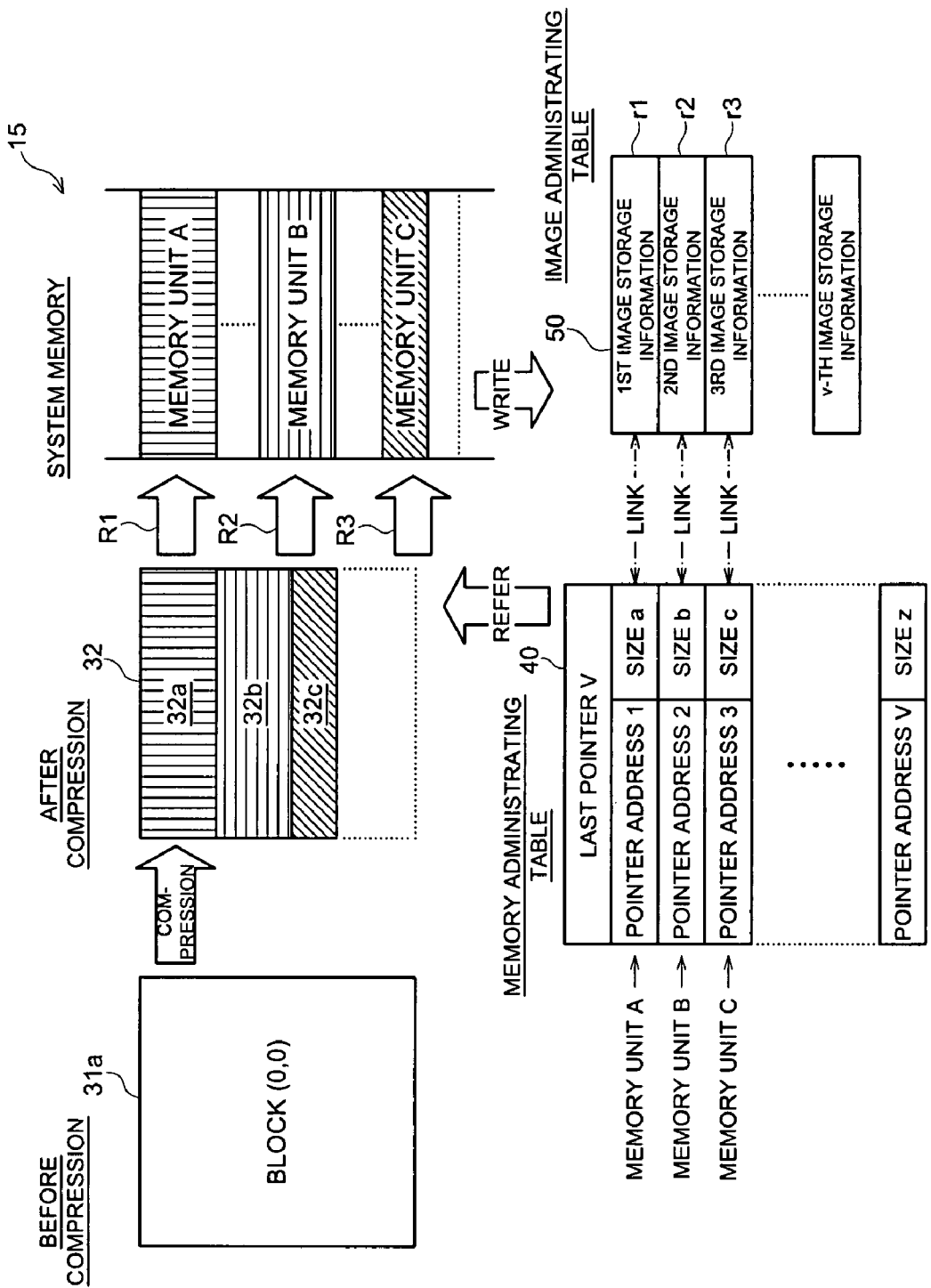
FIG. 9 is an explanatory diagram representing how the image data of the block (0, 0) is compressed and stored into the system memory.

FIG. 9 shows how the image data of the block (0, 0) is compressed and stored into the system memory 15. The image data 31a of the block (0, 0) is compressed and formed into compression data 32. The system controller 11 refers to the memory administrating table 40, and stores the compression data 32 in the memory unit A of the system memory 15 (R1), based on the unit information (pointer address 1 and size a) of the memory unit A registered in the leading edge thereof.

If the memory unit A has reached the Full status in the middle of storage, the attribute information on the image data (compression data 32a) stored in the memory unit A (the first image storage information r1) is written into the image administrating table 50.

The system controller 11 acquires the pointer address 2 and size b of the memory unit B from the next unit information registered in the memory administrating table 40, and stores the remaining image data (compression data 32b) in the memory unit B of the system memory 15 (R2). When this memory unit B has reached the Full status in the same manner, the attribute information (the second image storage information r2) on the image data (compression data 32b) stored in the memory unit B is additionally written at the end of the image administrating table 50. Thus, the image data (compression data 32c) following the next memory unit C (R3) is stored by referring to the memory administrating table 40.

In the process of storage into the memory unit C, storage of the compression data 32 in the block (0, 0) completes before the Full status is reached. Upon completion of storage, the attribute information (the third image storage information r3) on the image data (compression data 32c) stored in the memory unit C is written additionally at the end of the image administrating table 50. Then the system goes to the process of storage into the next block.

Figure 10:
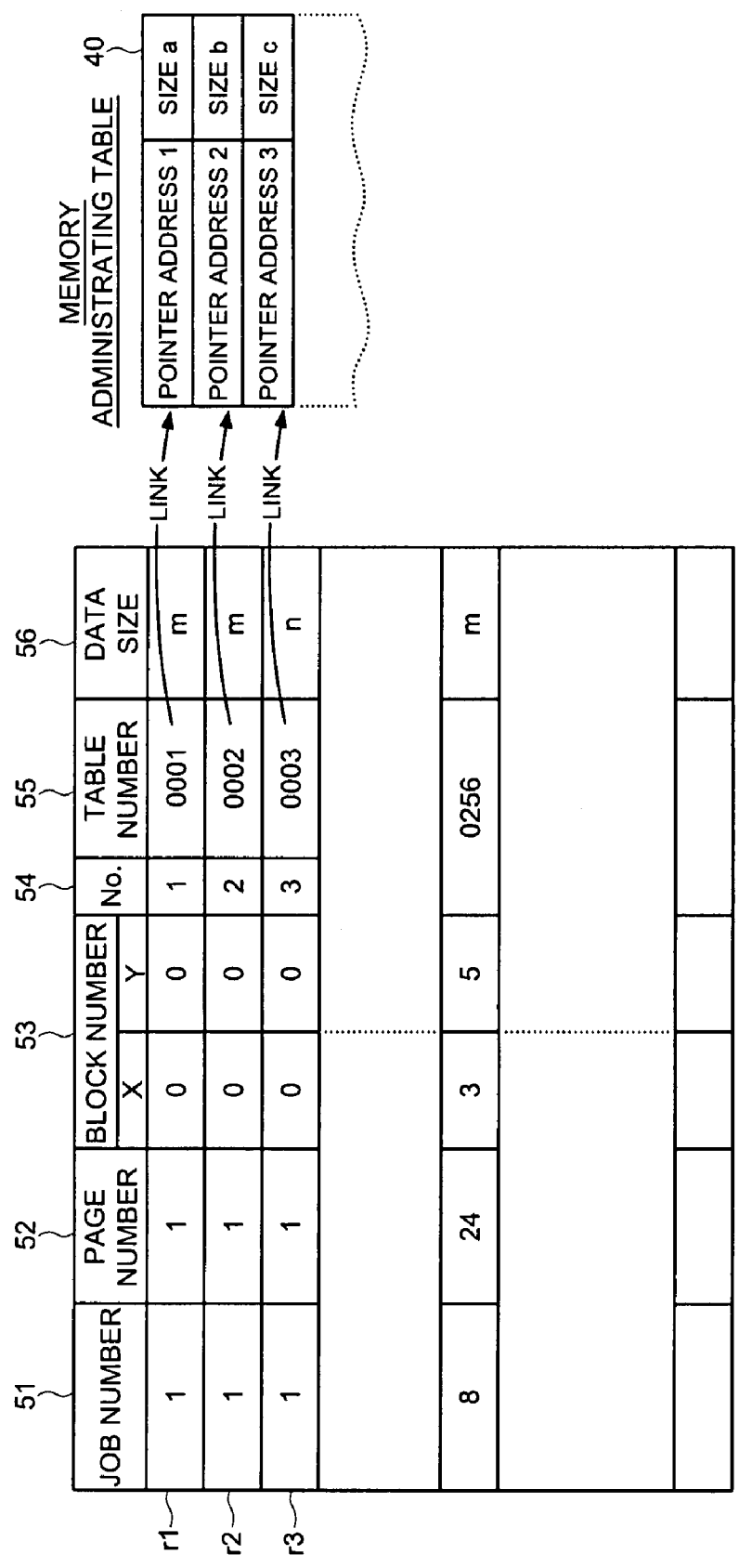
FIG. 10 is an explanatory diagram showing an example of the image administrating table.

FIG. 10 shows an example of the image administrating table 50. The attribute information of the image data stored in the memory unit is registered in the image administrating table 50 for each memory unit. The attribute information to be registered is exemplified by job information (job number) 51, page information (page number) 52, block number 53, intra-block serial number 54, table number 55 and data size 56.

The job number 51 is the information for identifying the job, and is used for separate management of a plurality of jobs. The page number 52 is the information for handling a plurality of pages in one job, and indicates the page position within the job. The block number 53 is the information for identifying the divided blocks. It is expressed by the coordinate information (X, Y) of FIG. 2.

When image data in one block is stored in a plurality of memory units, the intra-block serial number 54 indicates its ordinal position of this memory unit as counted from the head of the block. If the order of registration inside the image administrating table 50 can perform the function as the intra-block serial number 55, the intra-block serial number 54 may be omitted.

The table number 55 is the linkage information showing the position referred to for the unit information on the memory unit storing the image data. The linkage number used here is the number showing the ordinal position of the information to be referred to, as counted from the head of the memory administrating table 40. It is also possible to use the address or pointer information at the position to be referred to. Instead of the table number 55, the unit information (pointer address or size) of the relevant memory unit can also be registered directly into the image administrating table 50.

The data size 56 indicates the amount of the image data stored in the memory unit indicated by the table number.

The format of the table in the image administrating table 50 is not restricted to the illustration shown in FIG. 10. For example, when the image administrating table 50 is produced for each job or each page, it is sufficient only if the job number and page number are registered in the header portion of each image administrating table 50. It is sufficient only if at least the position information within one page of the image data stored in each memory unit and the storage site information indicating the position and size within the system memory of the memory unit are registered in the form linked with each other.

By referring to the image administrating table 50 as shown in FIG. 10, it is possible to recognize the image data of which block on which page of which job is stored in which memory unit. Thus, based on the image administrating table 50, the one-page image data stored in a dispersed form in a plurality of memory regions located in the discrete position within the system memory 15 can be read out in the form linked to the original one-page image data. Further, by referring to the image administrating table 50, it is possible to recognize the block of which position on each page is stored in which memory unit. For example, A rotating image can be read out by controlling the order of reading the blocks.

Further, the attribute information on the stored image data is automatically registered in the image administrating table 50 by the system controller 11. This reduces the load of processing by the processor 12, as compared to the case wherein such a process of registration is executed by the processor 12. Further, the system controller 11 as the subject of the storage operation knows the size of the image data of each block that is stored in a memory unit, and also knows which is that memory unit. Accordingly, efficient registration into the image administrating table 50 is ensured if the attribute information (image storage information) in the stored image data is registered in the image administrating table 50 by system controller 11.

Figure 11:
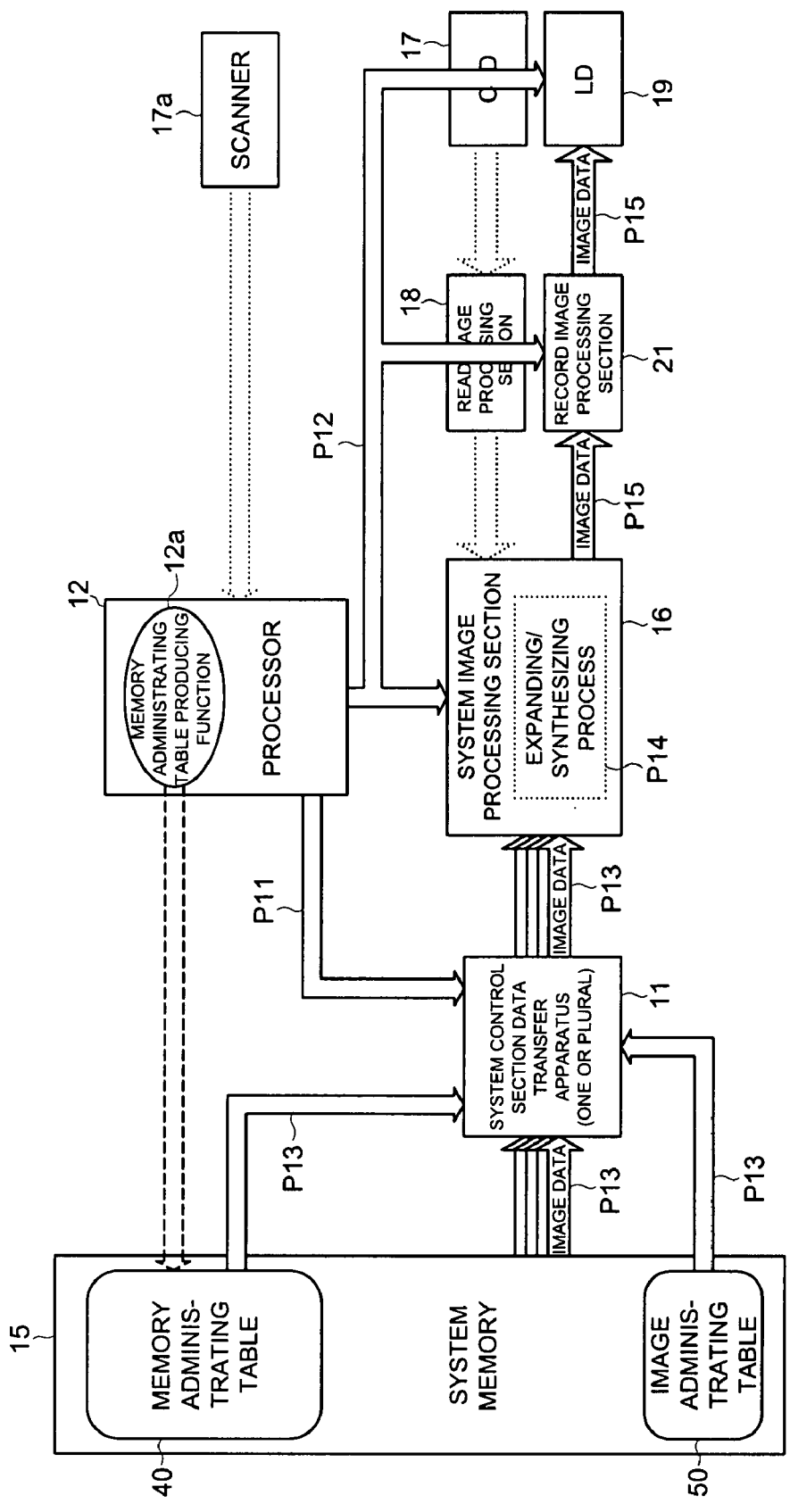
FIG. 11 is an explanatory diagram showing the flow of commands and data in the process of image output.

FIG. 11 shows the flow of the command and data in the process of image output. The processor 12 reports the information on the job number, page number and rotation on the page to be outputted this time, to the system controller 11 (P11), and starts the system image processing section 16, recorded image processing section 21 and LD 19 (P12). The system controller 11 refers to the image administrating table 50 stored in the system memory 15 to find out the image storage information having the reported job number and page number.

Further, the system controller 11 determines the order of reading out the block from the reported information on rotation, and reads the relevant image storage information from the image administrating table 50 according to the order determined in this manner. Based on the table number 55 including in that image storage information, the system controller 11 refers to the memory administrating table 40 to identify the position and size of the memory unit of the memory unit storing the image data corresponding to the image storage information. The image data is then read out from this memory unit and is transferred to the system image processing section 16 (P13).

Upon completion of transfer of the one-block image data, the system image processing section 16 decompresses the image data and recovers the image data before being compressed. It also allocates the recovered one-block image data at a predetermined position within the page memory (P14). This processing is continued up to the time of completion for all the blocks of one page. If the one-page image data has been prepared, the image data is outputted to the LD 19 through the recorded image processing section 21, and is printed on a recording sheet (P15).

Figure 12:
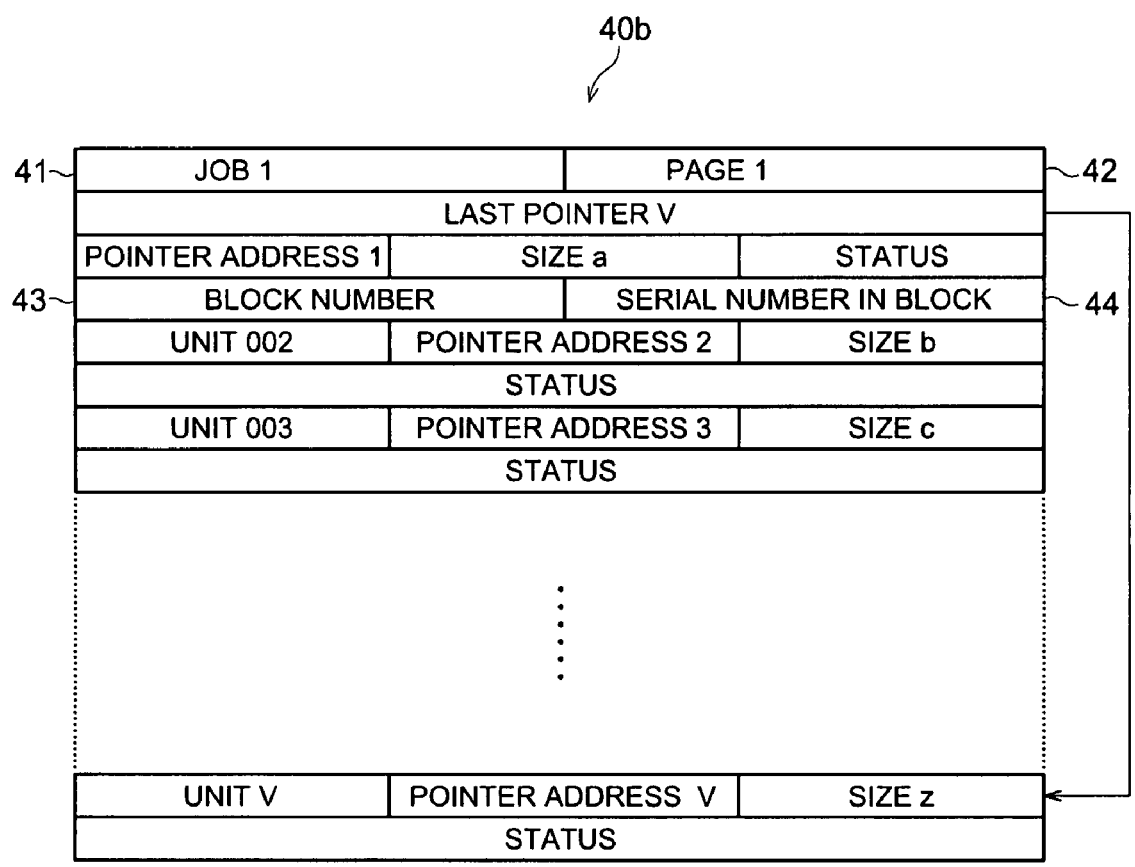
FIG. 12 is an explanatory diagram showing an example of the memory administrating table wherein the information to be registered in the image administrating table is further registered.

FIG. 12 shows another example of the memory administrating table 40b. To ensure that the image data can be read out according to the memory administrating table 40b alone, without referring to the image administrating table 50, some pieces of information registered in the image administrating table 50 are additionally registered. To put it more specifically, the job number 41 and page number 42 are registered as header information of the memory administrating table 40b, and the block number 43 and intra-block serial number 44 of the image data stored in the memory unit indicated by the unit information are registered for each piece of unit information.

The block number 43 and intra-block serial number 44 can be registered into the memory administrating table 40b by the system controller 11. Alternatively, the processor 12 can refer to the image administrating table 50 to copy into the memory administrating table 40b. When the system controller 11 registers the block number 43 and intra-block serial number 44 into the memory administrating table 40b, the system controller 11 need not produce a image administrating table 50.

Next, the second embodiment to attain the first object of the present invention is explained.

In the image processing apparatus 10a of the second embodiment, data transfer between the system memory 15 and system image processing section 16 is carried out by the DMA transfer using a script file. Except for the data transfer method, the structure is the same as that of the first embodiment, and will not be described to avoid duplication.

Figure 13:
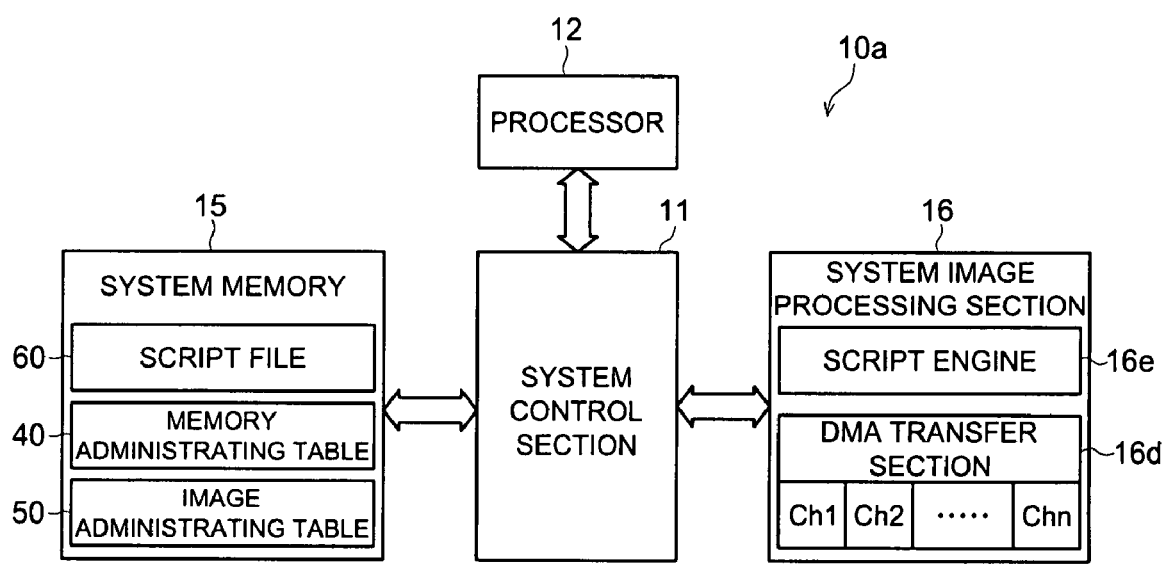
FIG. 13 is a block diagram showing an extract of the components of the script file of the image processing apparatus as a second embodiment of the present invention.

FIG. 13 shows the components of the script file in the image processing apparatus 10a as a second embodiment. In the system memory 15, the memory administrating table 40 and image administrating table 50 which are the same as those of the first embodiment are produced. In addition, a script file 60 is produced by the processor 12. The script file 60 contains the description of the divided status of the one-page image data.

The system image processing section 16 has a function as the DMA transfer section 16d equipped with a plurality of DMA channels Ch1 through Chn, and as the script engine 16e for analyzing the contents of a script file 60, setting parameters to the DMA transfer section 16d and starting them.

Figure 14:
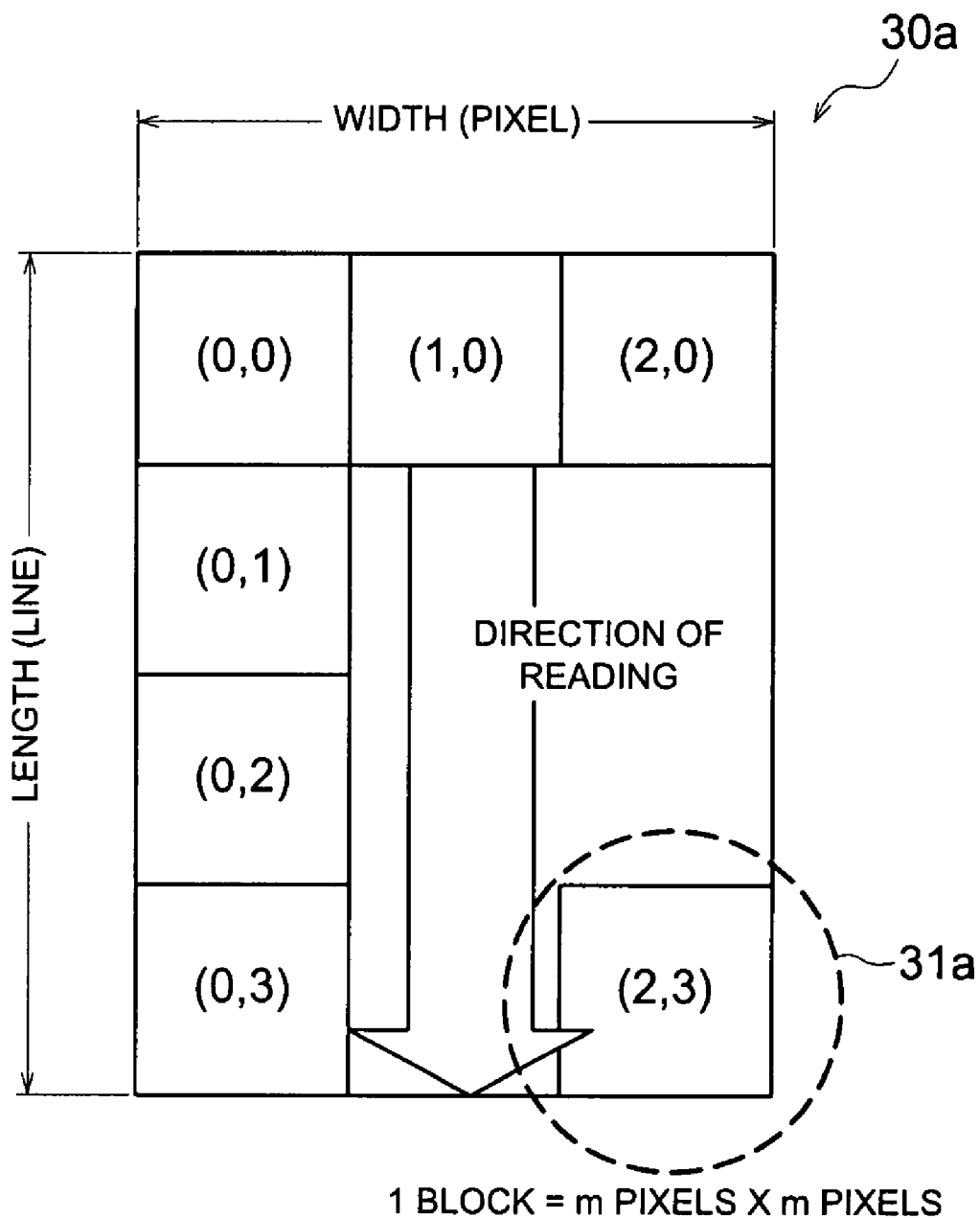
FIG. 14 is an explanatory diagram showing how the image data is divided, for the explanation of the second embodiment of the present invention.

In the second embodiment, as shown in FIG. 14, the image divider 16a divides the one-page image data 30a into three blocks in the horizontal direction and four blocks in the vertical direction, and divides all the pages into 12 blocks. Similarly to the case of FIG. 2, the position of each block 31a within the page is expressed by coordinate information (X, Y). Further, each block has the same size and the number of pixels in the horizontal direction is the same as the number of pixels in the vertical direction.

FIG. 15 shows an example of the script file 60a wherein the DMA channel is assigned on a permanent basis for each divided block of image data in the horizontal direction. The script file 60a includes the description of the number of DMA channels 61 and the number of line blocks 62 as the number of divisions in the vertical direction. Further, each DMA channel registers the start position (H_Start_Pointer) 63 of the block under the charge of the DMA channel in the horizontal direction and the number of pixels 64 of the block in the horizontal direction. Further, the start position (V_Start_Pointer) 65 of the line block in the vertical direction and the number of pixels (number of lines) 66 in the vertical direction are registered for each divided block (called a line block) in the vertical direction.

Based on these pieces of information described in the script file 60a, the script engine 16e identifies the division status of page, namely, the number of blocks, and the position and size of each block within the page. Further, it also recognizes that the DMA channel Ch1 takes charge of the transfer of blocks (0, 0), (0, 1), (0, 2) and (0, 3) of FIG. 14, the DMA channel Ch2 takes charge of the transfer of the blocks (1, 0), (1, 1), (1, 2) and (1, 3), and the DMA channel Ch3 takes charge of the blocks (2, 0), (2, 1), (2, 2) and (2, 3).

Figure 16:
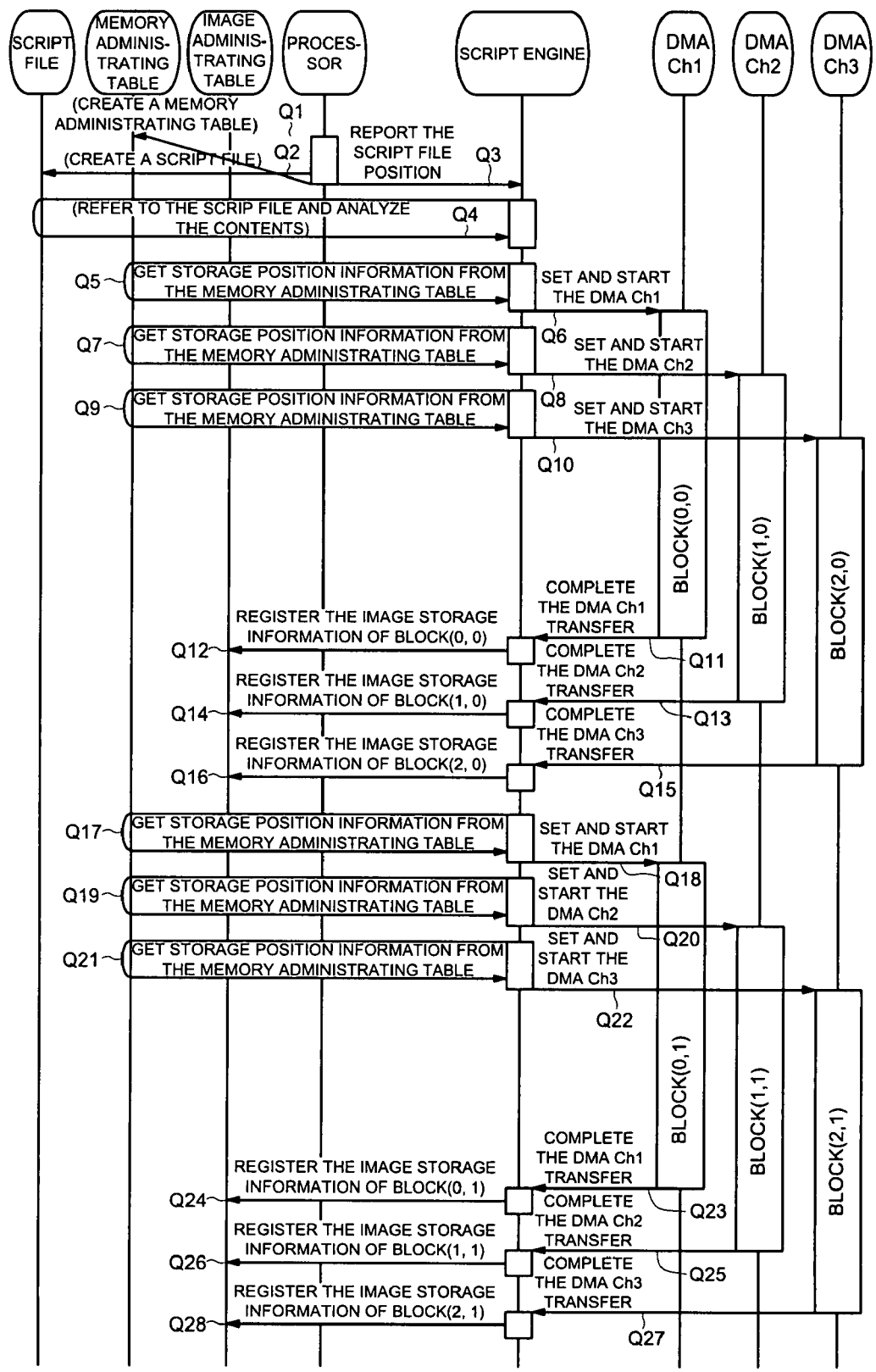
FIG. 16 is an explanatory diagram showing the flow of the process of DMA transfer using the script file of FIG. 15.

FIG. 16 is an explanatory diagram showing the flow of the process of DMA transfer using the script file 60a of FIG. 15. Upon receipt of the job execution instruction accompanying the image reading operation from the user, the processor 12 produces the memory administrating table 40 in the system memory 15 (Q1), similarly to the case of the first embodiment. Then the region for producing the image administrating table 50 is acquired and the script file 60a (Q2) is produced, based on the job information. Further, the processor 12 sets a flag for instructing the reference to the script file 60a to the script engine 16e, and notifies the script engine 16e (Q3) of the information on the position (pointer address) of the script file 60a, memory administrating table 40, image administrating table 50 within the system memory 15.

From the script file 60a, the script engine 16e receives the number of DNA channels, the number of line blocks, the horizontal start position of the block under the change of each DMA channel, the number of pixels in the horizontal direction, the vertical start position of each line block, and the number of pixels (number of lines) in the vertical direction (Q4).

The script engine 16e refers the memory administrating table 40 to acquire the storage site information (pointer address and size of the memory unit storing the image data) (Q5), and sets to the DMA channel Ch1 a parameter as the start address for transferring the block (0, 0) and the number of transfer bites as well as the start bit (transfer start instruction). Then it starts the DMA Ch1 (Q6). This allows the DMA channel Ch1 to transfer the image data of the block (0, 0) from the system image processing section 16 to the system memory 15 where the image data is stored.

Similarly, the script engine 16e refers to the memory administrating table 40 to acquire the storage site information (Q7), and sets to the DMA channel Ch2 a parameter such as the Start address for transfer the block (1, 0) and number of transfer bites, as well as the start bit (transfer start instruction). Then it starts the DMA Ch2 (Q8). This allows the DMA channel Ch2 to transfer the image data of the block (1, 0) from the system image processing section 16 to the system memory 15 where the image data is stored.

Further, the script engine 16e refers to the memory administrating table 40 to acquire the next the storage site information (Q9), and sets to the DMA channel Ch3 a parameter such as the Start address for transfer the block (2, 0) and number of transfer bites, as well as the start bit (transfer start instruction). Then it starts the DMA Ch3 (Q10). This allows the DMA channel Ch3 to transfer the image data of the block (2, 0) from the system image processing section 16 to the system memory 15 where the image data is stored.

Upon receipt of the completion report of the DMA transfer from the DMA channel Ch1 (Q11), the script engine 16e analyzes of the reported content and clears the end flag of the DMA channel Ch1. Thus, the image storage information on the image data stored in this DMA transfer is registered in the image administrating table 50 (Q12).

If the transfer of the one-block image data has not yet complete in the last DMA transfer for such a reason as the size of the memory unit acquired from the memory administrating table 40 being smaller than the transfer size, the script engine 16e refers to the memory administrating table 40, and recognizes the pointer address and size of the next memory unit. Assuming this memory unit as a transfer destination region, the script engine 16e reestablishes the DMA channel Ch1 so that the remaining image data is transferred. Upon completion of this transfer, the image storage information on the last transferred image data is registered in the image administrating table 50.

Upon receipt of the completion report of the DMA transfer from the DMA channel Ch1 (Q13), the script engine 16*e* analyzes of the reported content and clears the end flag of the DMA channel Ch2. Thus, the image storage information on the image data stored in this DMA transfer is registered in the image administrating table 50 (Q14). If the transfer of the one-block image data has not yet completed in the last DMA transfer, the script engine 16*e* refers to the memory administrating table 40, and resets the DMA channel Ch2, performs DMA transfer of the remaining image data to the next memory unit, and registers the image storage information for this transfer in the image administrating table 50, similarly to the case of the DMA channel Ch1.

Further, upon receipt of DMA transfer completion report from the DMA channel Ch3 (Q15), the script engine 16*e* analyzes of the reported content and clears the end flag of the DMA channel Ch3. Thus, the image storage information on the image data stored in this DMA transfer is registered in the image administrating table 50 (Q16). If the transfer of the one-block image data has not yet completed in the last DMA transfer, the script engine 16*e* takes the same procedures as those of other DMA channels.

Upon completion of the transfer of image data of block (0, 0), block (1, 0) and block (2, 0) in the manner described above, the script engine 16*e* uses the DMA channel Ch1 for DMA transfer of the block (0, 1) image data, similarly to the aforesaid procedures from Q5 through Q16. Further, it uses the DMA channel Ch2 for DMA transfer of block (1, 1) image data, and the DMA channel Ch3 for DMA transfer of block (2, 1) image data. Upon completion of each transfer operation, the relevant image storage information is registered in the image administrating table 50 (Q17 through Q28).

Further, the script engine 16*e* (the following operations not shown in FIG. 16) uses the DMA channel Ch1 for DMA transfer of block (0, 2) image data, the DMA channel Ch2 for DMA transfer of block (1, 2) image data, and the DMA channel Ch3 for DMA transfer of block (2, 2) image data. Upon completion of each transfer operation, the relevant image storage information is registered in the image administrating table 50. After that, the script engine 16*e* again uses the DMA channel Ch1 for DMA transfer of block (0, 3) image data, the DMA channel Ch2 for DMA transfer of block (1, 3) image data, and the DMA channel Ch3 for DMA transfer of block (2, 3) image data. Upon completion of each transfer operation, the relevant image storage information is registered in the image administrating table 50.

Upon completion of the DMA transfer of all the blocks specified by the script file 60*a* in this manner, the script engine 16*e* reports the completion of processing to the processor 12, thereby terminating a series of operations.

As described above, the script engine 16*e* automatically performs the DMA transfer of the image data divided into a plurality of blocks through a plurality of DMA channels by referring to the script file 60*a* and memory administrating table 40. This arrangement reduces the processing load of the processor 12.

Upon completion of the DMA transfer, the image storage information on the transferred image data is registered in the image administrating table 50 by the script engine 16*e*. This procedure also reduces the processing load of the processor 12. Further, similarly to the case of the first embodiment, the image data stored in the form divided into a plurality of memory units can be connected to the original one-page image data and reproduced in the original form by reference to the image administrating table 50 and memory administrating table 40

When the memory administrating table 40*b* of FIG. 12 is used, it is also possible to arrange such a configuration that the block number 43 and intra-block serial number 44 are registered in the memory administrating table 40*b* by script engine 16*e*.

The following describes the case where the DMA channel is not assigned on a permanent basis.

Figure 17:
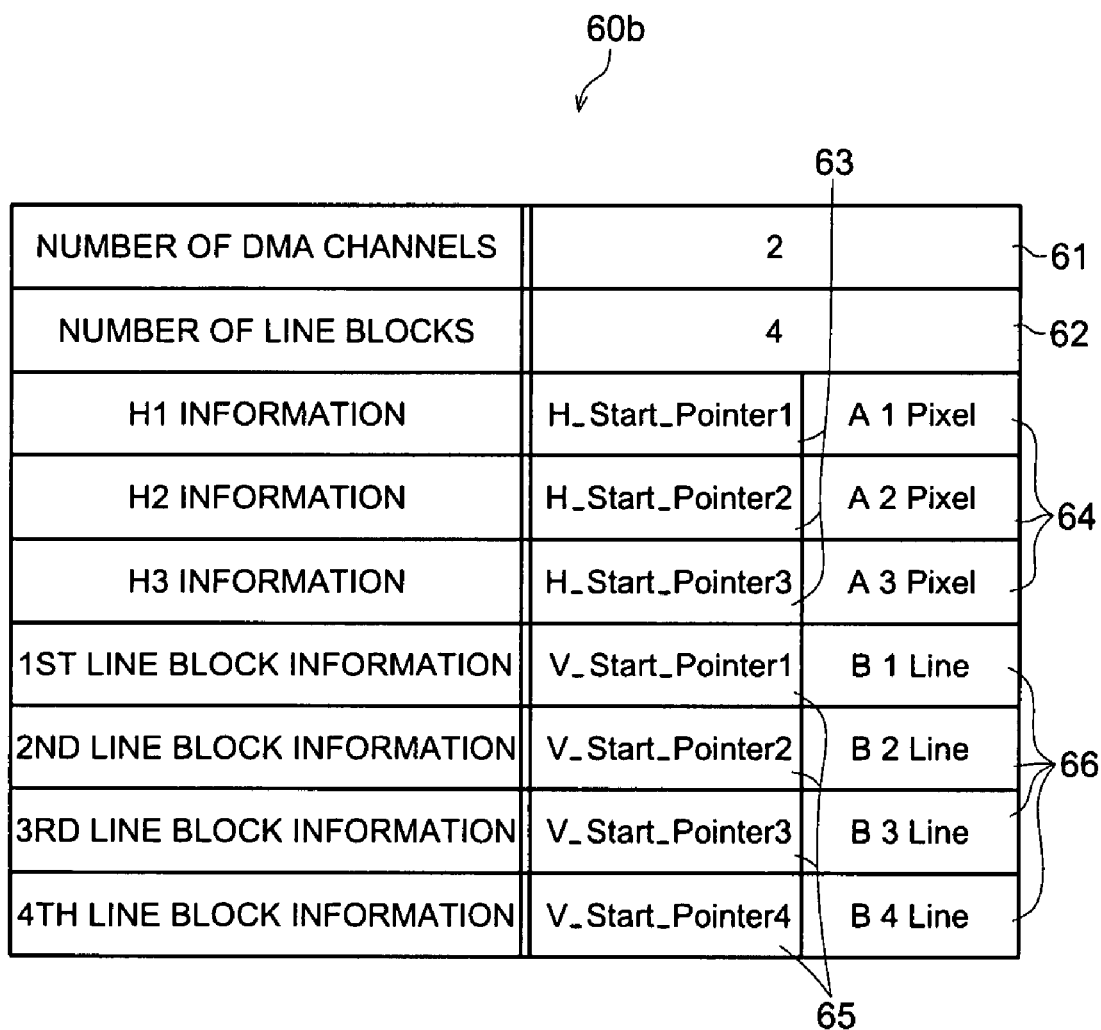
FIG. 17 is an explanatory diagram showing an example of the script file for flexible use of the DMA channel.

FIG. 17 shows an example of the script file 60*b* for flexible use of the DMA channel. The script file 60*b* is different from the script file 60*a* of FIG. 15 in that the information on the start position 63 and the number of pixels 64 in the horizontal direction are registered simply as information (H1 information, H2 information, H3 information) on the division in the horizontal direction, without being linked directly with the DMA channel, and that the number of the specified DMA channels is "2". Otherwise, they are the same with each other. When the DMA channel is used in a flexible manner, there may be disagreement between the number of division in the horizontal direction and the number of the DMA channels to be used. The script file 60*b* of FIG. 17 shows an example of the cases where image data is transferred using two DMA channels wherein the number is smaller than "3", the number of division in the horizontal direction.

The script engine 16*e* refers to the script file 60*b* to identify the block division status, and processes blocks sequentially starting, for example, from the block (0, 0), using the unoccupied DMA channel.

Figure 18:
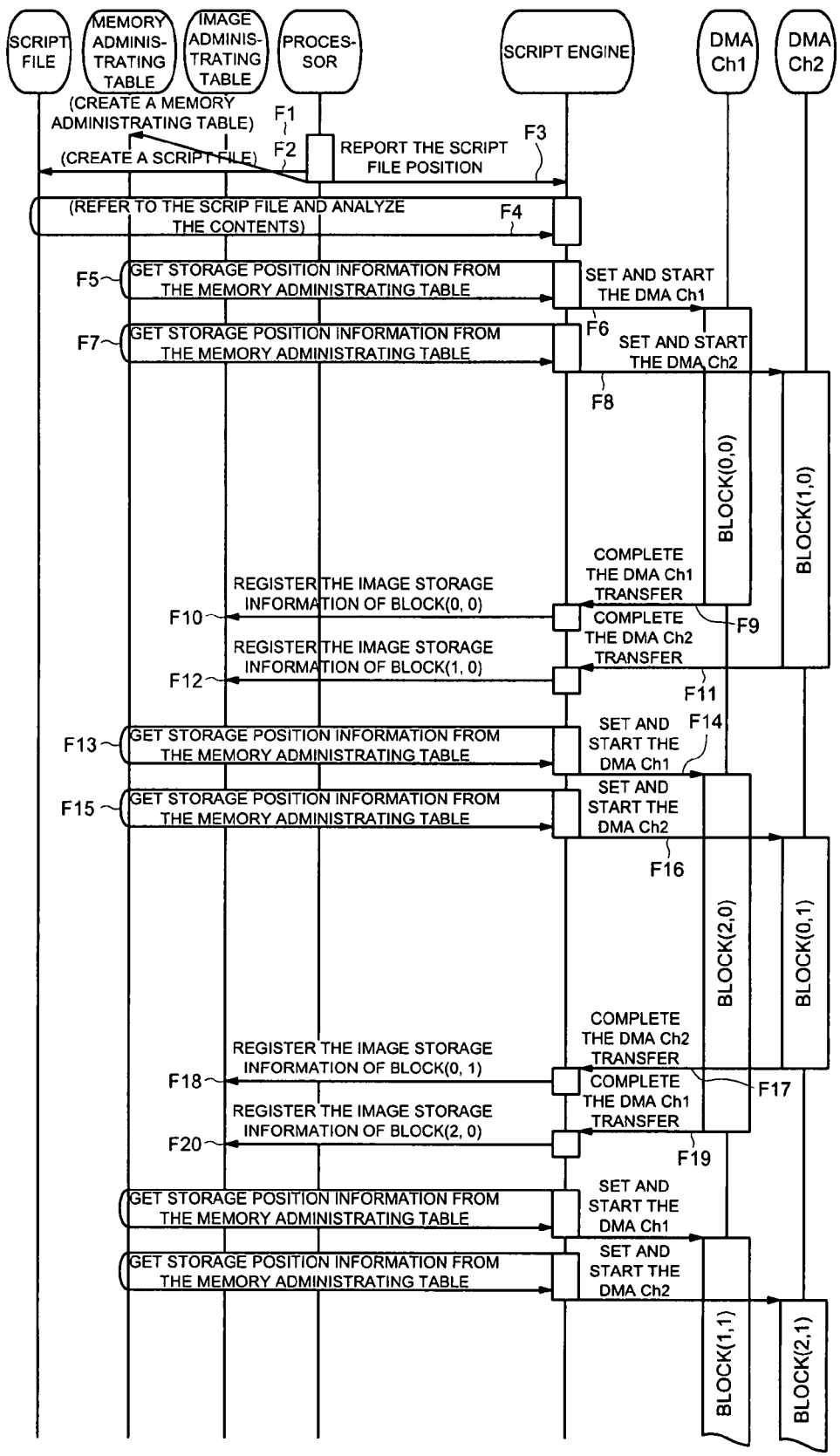
FIG. 18 is an explanatory diagram showing the flow in the process of DMA transfer using the script file of FIG. 17.

FIG. 18 shows flow in the process of DMA transfer using the script file 60*b* of FIG. 17. The procedures F1 through F4 are the same as the procedures Q1 through Q4 of FIG. 16. To be more specific, the memory administrating table 40 is produced by the processor 12 (F1), the image administrating table 50 is acquired, the script file 60*b* is produced (F2), and report is sent to the script engine 16*e* (F3). The script engine 16*e* uses two DMA channel from the script file 60*b* and acquires information on the block division status (F4).

Then the script engine 16*e* refers to the memory administrating table 40 to acquire the storage site information (pointer address and size of the memory unit) (F5), and sets to the DMA channel Ch1 a parameter such as the Start address for transfer the block (0, 0) and number of transfer bites, as well as the start bit (transfer start instruction). Then it starts the DMA Ch1 (F6). This allows the DMA channel Ch1 to transfer the image data of the block (0, 0) from the system image processing section 16 to the system memory 15 where the image data is stored.

Similarly, the script engine 16*e* refers to the memory administrating table 40 to acquire the storage site information (F7), and sets to the DMA channel Ch2 a parameter such as the Start address for transfer the block (1, 0) and number of transfer bites, as well as the start bit (transfer start instruction). Then it starts the DMA Ch2 (F8). This allows the DMA channel Ch2 to transfer the image data of the block (1, 0) from the system image processing section 16 to the system memory 15 where the image data is stored.

Upon receipt of the completion report of the DMA transfer from the DMA channel Ch1 (F9), the script engine 16*e* analyzes of the reported content and clears the end flag of the DMA channel Ch1. Thus, the image storage information on the image data stored in this DMA transfer is registered in the image administrating table 50 (F10).

Similarly, upon receipt of the completion report of the DMA transfer from the DMA channel Ch2 (F11), the script engine 16*e* analyzes of the reported content and clears the end flag of the DMA channel Ch2. Thus, the image storage information on the image data stored in this DMA transfer is registered in the image administrating table 50 (F12).

If the transfer of the one-block image data has not yet completed in each DMA transfer operation, the script engine 16e refers to the memory administrating table 40 to acquire the next storage site information, resets the DMA channel, and performs DMA transfer of the remaining image data to the next memory unit. Upon completion of transfer, it registers the image storage information of the last transferred image data in the image administrating table 50, similarly to the procedure of FIG. 16.

Upon completion of the transfer of image data of block (0, 0) and block (1, 0) in the manner described above, the script engine 16e uses the DMA channel Ch1 for DMA transfer of the block (2, 0) image data, and uses the DMA channel Ch2 for DMA transfer of block (0, 1) image data. Then the image storage information for the transferred data image is registered in the image administrating table 50 (F13 through F20).

Similarly, the script engine 16e uses the DMA channels Ch1 and Ch2 to transfers the blocks (1, 1) and block (2, 1), the blocks (2, 2) and block (0, 3), and then the blocks (1, 31) and block (2, 3), sequentially in that order. After each transfer operation, image storage information is registered in the image administrating table 50. Upon completion of DMA transfer of all blocks specified in the script file 60b in the manner described above, the script engine 16e reports the completion of processing to the processor 12 and completes the operation.

Figure 19:
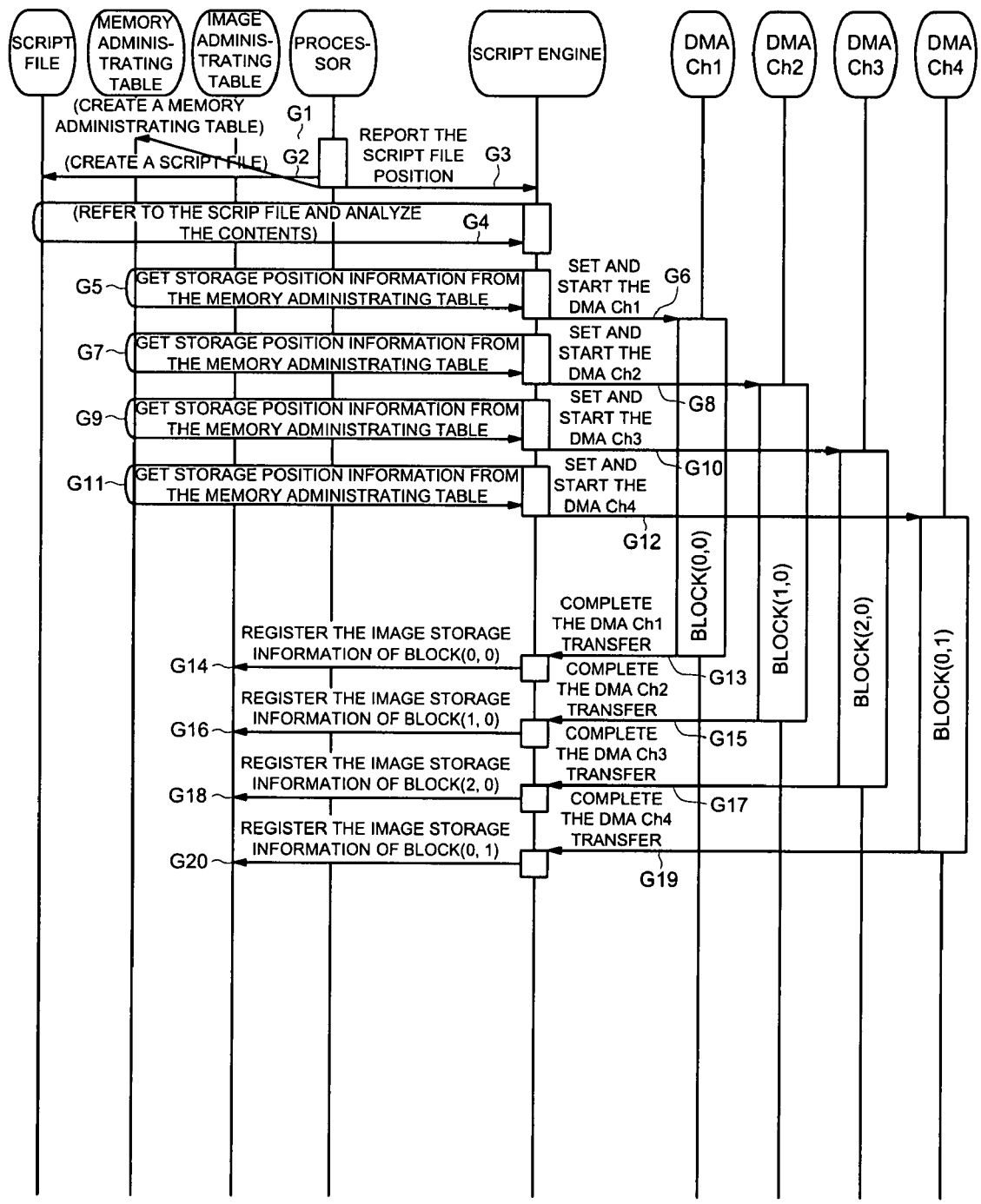
FIG. 19 is an explanatory diagram showing the flow in the process of DMA transfer at the time of flexible use of four DMA channels.
Figure 20:
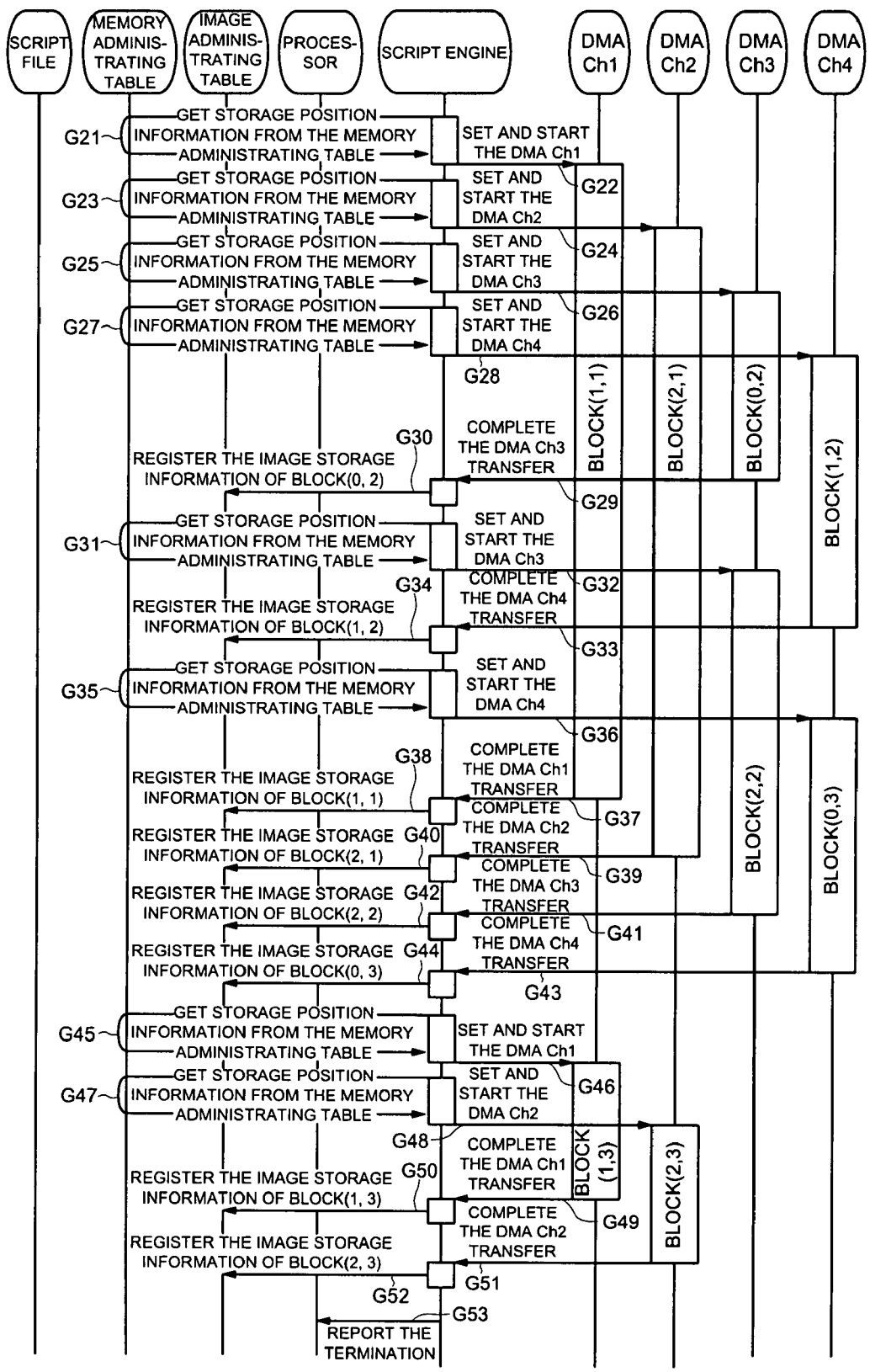
FIG. 20 is an explanatory diagram showing the rest of FIG. 19.

FIG. 19 and FIG. 20 show an example of the flow in the process of DMA transfer at the time of flexible assignment of four DMA channels. The script file to be used is that same as that shown in FIG. 17, except that the number of DMA channels is "4". The illustration and description will omitted to avoid duplication.

The processes G1 through G4 of FIG. 19 are the same as the Q1 through Q4 of FIG. 16. The processor 12 produces the memory administrating table 40 (G1), acquires the image administrating table 50, produces the script file (G2), and sends a report to the script engine 16e (G3). Further, the script engine 16e uses four DMA channels from the aforementioned script file and identifies the block division status (G4).

Referring to the memory administrating table 40, the script engine 16e sets the transfer of the block (0, 0) to the DMA channel Ch1, and starts the transfer (G5, G6); sets the transfer of the block (1, 0) to the DMA channel Ch2, and starts the transfer (G7, G8); sets the transfer of the block (2, 0) to the DMA channel Ch3, and starts the transfer (G9, G10); and sets the transfer of the block (0, 1) to the DMA channel Ch4, and starts the transfer (G11, G12).

After that, upon receipt of the DMA transfer completion report from the DMA channel Ch1 (G13), the script engine 16e analyzes of the reported content and clears the end flag. The image storage information on the image data stored in this DMA transfer is registered in the image administrating table 50 (G14). The same processing applies to the completion report from the DMA channels Ch2, Ch3 and Ch4 (G15 through G20).

Referring to the memory administrating table 40, the script engine 16e sets the transfer of the block (1, 1) to the DMA channel Ch1, and starts the transfer (G21 and G22 of FIG. 20); sets the transfer of the block (1, 1) to the DMA channel Ch2, and starts the transfer (G23 and 24); sets the transfer of the block (0, 2) to the DMA channel Ch3, and starts the transfer (G25 and G26); and sets the transfer of the block (1, 2) to the DMA channel Ch4, and starts the transfer (G27 and G28).

Instructions to transfer the next block are sequentially given by the script engine 16e to the DMA channel which has become unoccupied subsequent to completion of the DMA transfer. In the example of FIG. 20, the size of data in the block (0, 2) is small, and DMA transfer is completed in DMA channel Ch3 earlier than the DMA channels Ch1 and Ch2 which were set and started earlier (G29, G30). Thus, the process of setting and startup to transfer the next block (2, 2) is applied to the DMA channel Ch3 (G31, G32). Similarly, the process of setting and startup to transfer the next block (0, 3) is applied (G35, G36) to the DMA channel Ch4 where the DMA transfer has completed (G33, G34).

This is followed by the steps of completing the transfer of the block (1, 1) by the DMA channel Ch1 and transfer of the block (2, 1) by the DMA channel Ch2 (G37 through G40). This is further by the step of completing the steps of transfer of the block (2, 2) by the DMA channel Ch3 (G37 through G40) and transfer of the block (0, 3) by the DMA channel Ch4 (G41 through G44).

The process of setting and startup for the transfer of the next block (1, 3) is applied to the DMA channel Ch1 which is the first to complete DMA transfer (G45 and G46). Then the process of setting and startup for the transfer of the last block (2, 3) is applied to the DMA channel Ch2 which is the second to complete DMA transfer to become unoccupied (G47 and G48). Upon receipt of these steps of transfer, the corresponding image storage information is registered in the image administrating table 50 (G49 through G52). This completes DMA transfer of all the specified blocks, and the script engine 16e reports the completion of processing to the processor 12 (G53), thereby terminating the operation.

As described above, without waiting for the completion of the transfer in all the DMA channels, an instruction for the transfer of the next block is given immediately to the DMA channel having completed transfer earlier. This arrangement ensures an effective use of a plurality of DMA channels and enhances the data transfer efficiency.

The DMA transfer by the script file may be used at the time of image output when the image data is sent from the system memory 15 to the system image processing section 16.

Next, the third embodiment to attain the second object of the present invention is explained.

Firstly, the following describes the flow of the processes from reading of an one-page document image through storing of that image data into the system memory 15.

Figure 21:
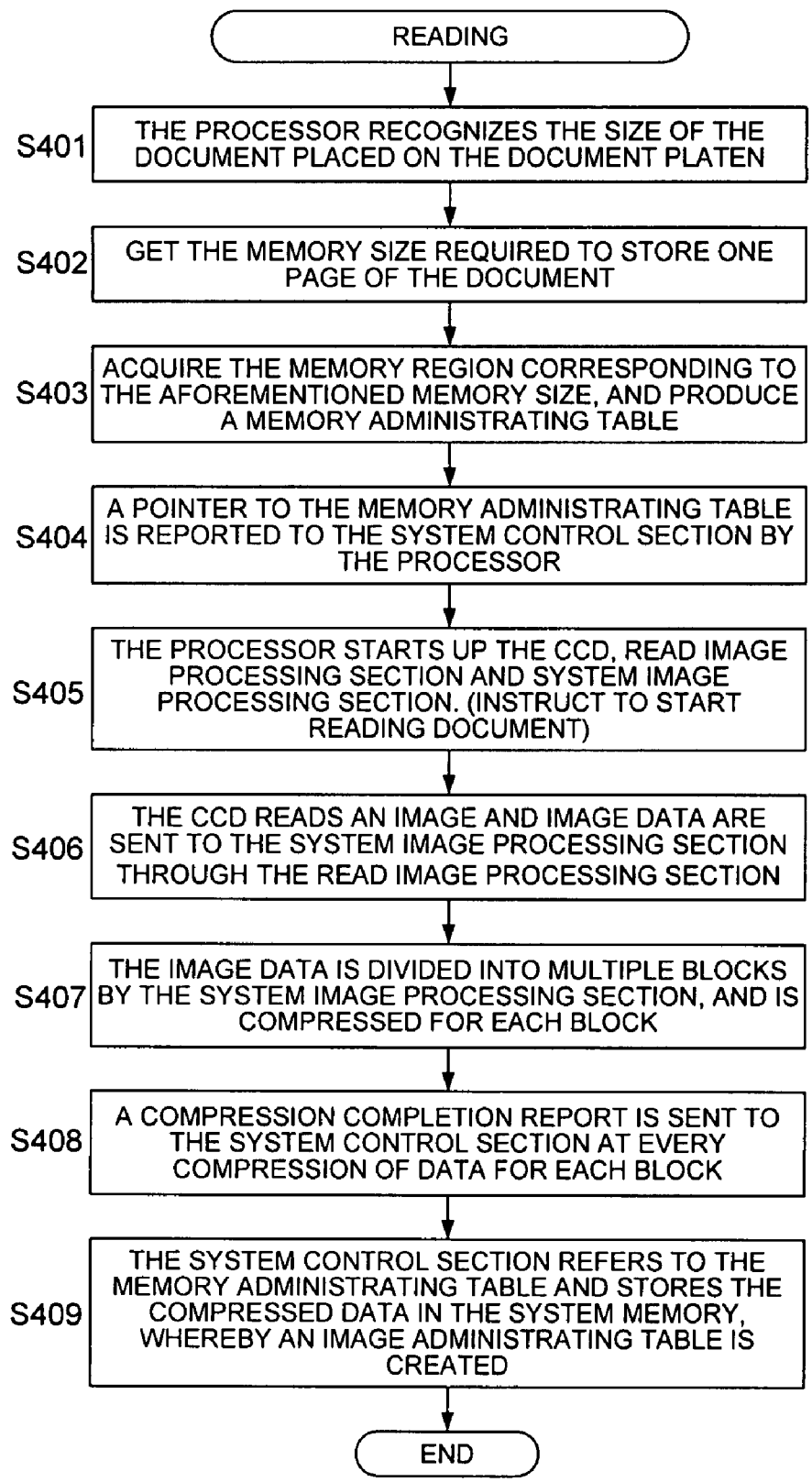
FIG. 21 is a flowchart representing all the reading operations conducted by the image processing apparatus as an embodiment of the present invention.
Figure 22:
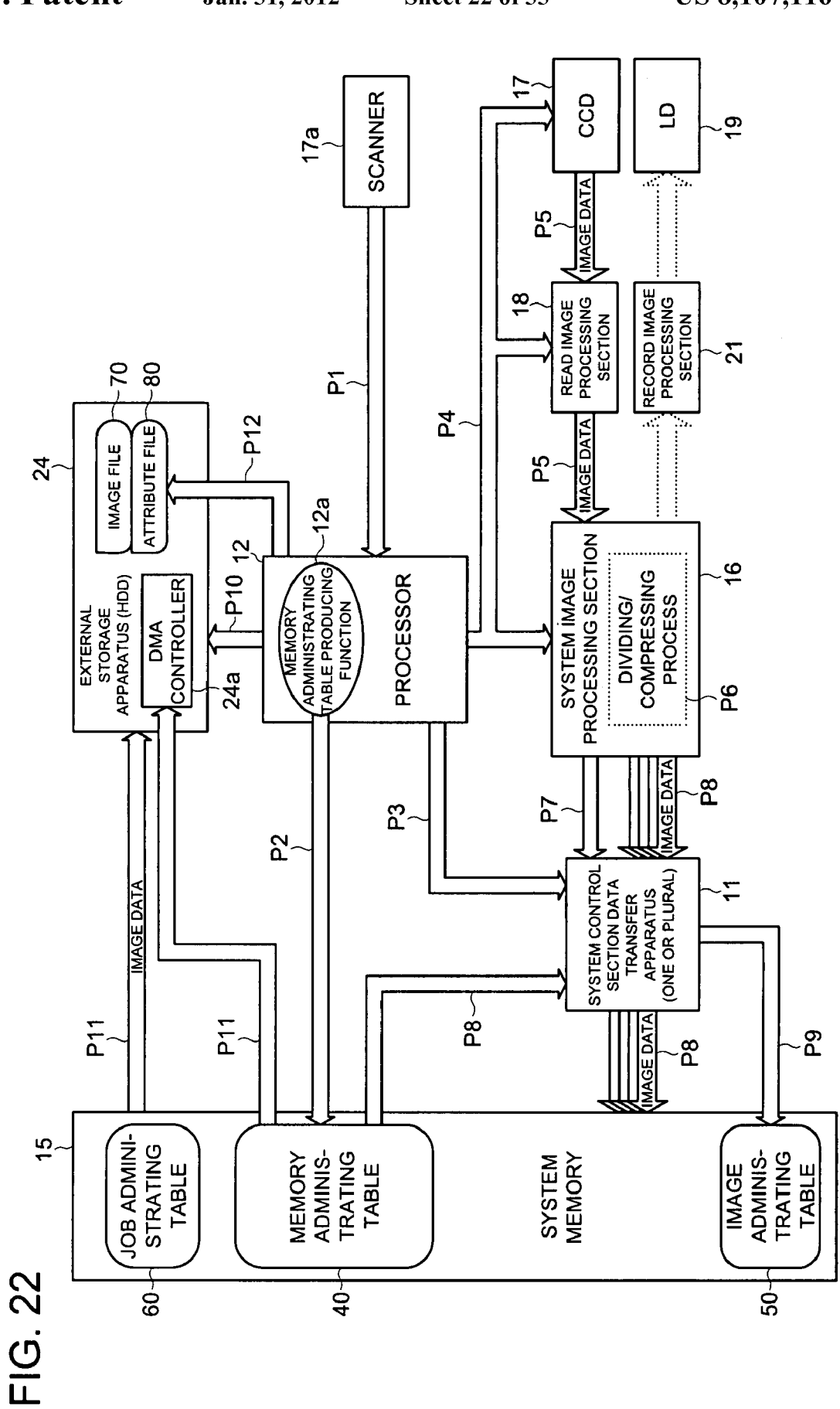
FIG. 22 is an explanatory diagram showing the commands and data in the reading operation of FIG. 21 and in the process of storing into the large-capacity storage device (HDD)

FIG. 21 represents the flow of the process in the reading operations, and FIG. 22 shows the flow of commands and data in that process. When the job is inputted and the Start button (not illustrated) is pressed, the processor 12 identifies the size of the document set on the scanner 17a of FIG. 22 (FIG. 21: Step S401, FIG. 22: P1), and finds the memory size required to store one page of the document (Step S402). Since the image data is stored in a compressed form, the memory size required for the storage of one page vary according to each image. In this phase, the standard memory size for the set document size is found out.

Then the processor 12 recalls the memory administrating table producing function 12a as the region acquiring section. The memory administrating table producing function acquires from the system memory 15 the memory region corresponding to the memory size required to store one page of the document. At the same time, the memory administrating table 40 for registering the position and size of the acquired memory region is produced in the (FIG. 21: Step S403 and FIG. 22: P2). The memory administrating table 40 is produced in the same data structure with that of descriptor table for DMA (table for DMA transfer) referred by DMA controller 24*a* in a large capacity storage device (HDD) 24. If the required memory size cannot be acquired as one continuous vacant region, the required memory region in terms of a total of multiple discrete vacant regions is acquired.

The processor 12 reports information on the produced memory administrating table 40 (address information of the memory administrating table 40) to the system controller 11 (FIG. 21: Step S404, FIG. 22: P3). Then it actuates the CCD 17, the read image processing section 18, and system image processing section 16 so that the document image reading operation starts (FIG. 21: Step S405 and FIG. 22: P4). Then the image data obtained by reading the document image from the CCD 17 is inputted into the read image processing section 18, and is subjected to the process of image correction and others. After that, the image data is transferred to the system image processing section 16 (FIG. 21: Step S406 and FIG. 22: P5).

As shown in FIG. 2, the system image processing section 16 divides the image data inputted from the read image processing section 18, into a plurality of blocks 31, and compresses image data according to each divided block (FIG. 21: Step S407 and FIG. 22: P6). At each completion of image data compression according to block, the system image processing section 16 sends a compression completion report for that block to the system controller 11 (FIG. 21: Step S408 and FIG. 22: P7).

Having received the compression completion report, the system controller 11 refers to the memory administrating table 40, identifies the position and size of the vacant region having been acquired, and stores the compressed image data into this vacant region (as a function of the store control section, FIG. 22: P9). Further, the system controller 11 registers the attribute information on the stored image data into the image administrating table 50 of the system memory 15, and serves the function as the image information registration section (FIG. 21: Step S409, FIG. 22: P8/P9). The attribute information includes the information for merging the image data stored in a plurality of discrete vacant regions, into the original continuous image data. The details of the information on the image administrating table 50 will be described later.

As described above, referring to the memory administrating table 40, the system controller 11 automatically transfers and stores the image data into the system memory 15, whereby the processing load of the processor 12 is reduced. Further, the attribute information on the stored image data is registered into the image administrating table 50 by the system controller 11 (image information registration section). This also reduces the load on the processor 12 for processing the creation/registration of the image administrating table 50. Further, at the time of reading, reference is made to the image administrating table 50. This procedure ensures that the image data stored separately in a plurality of discrete vacant regions can be connected into the original one-page image data.

If the size of compressed image data is greater than the standard size, and the vacant region registered in the memory administrating table 40 is insufficient, the system controller 11 requests the processor 12 to get a new memory region. In response to the request, the memory administrating table producing function 12*a* of the processor 12 acquires a new vacant region from the system memory 15. Then the information on the acquired memory region is additionally registered into the memory administrating table 40.

Figure 23:
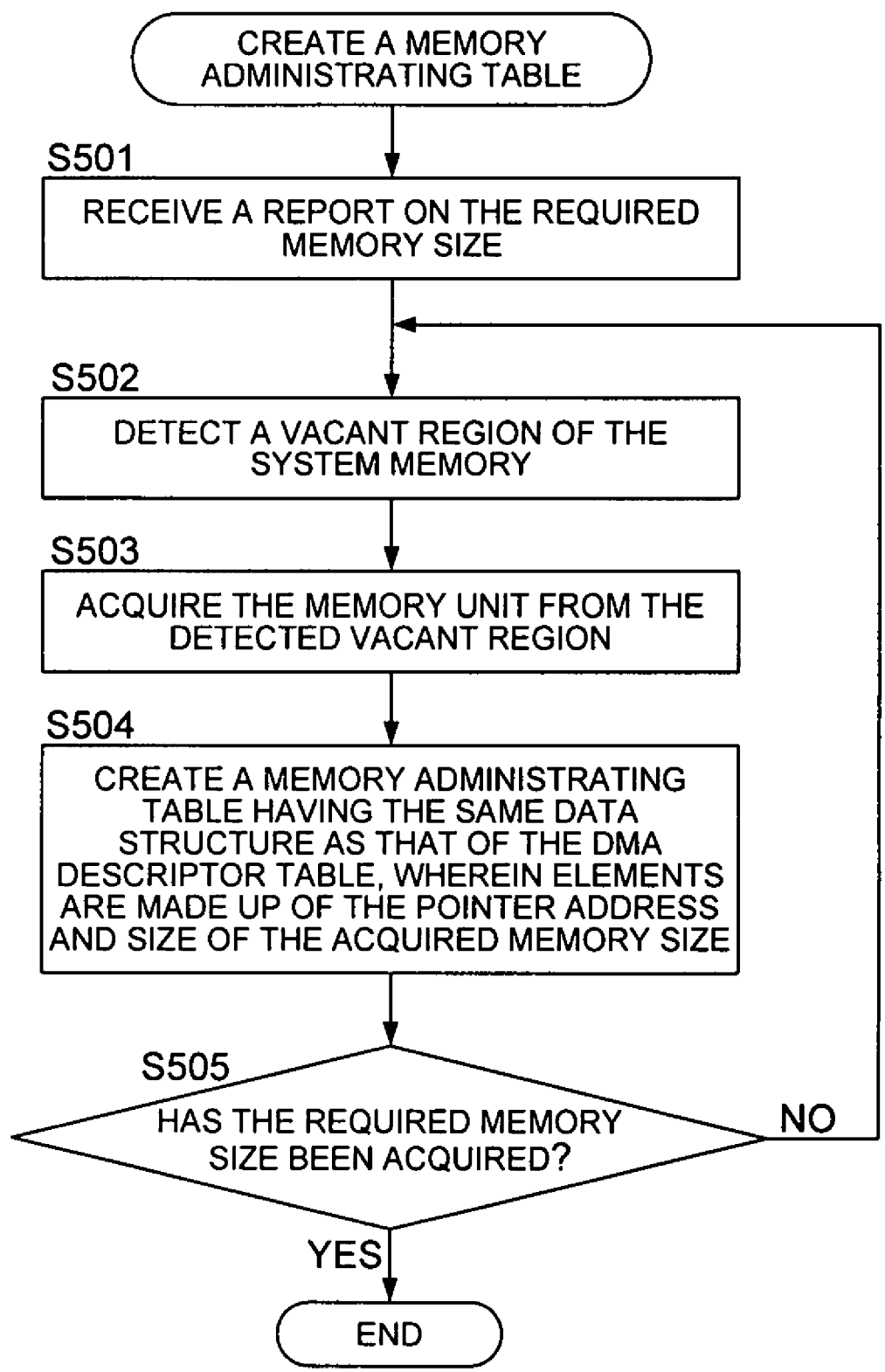
FIG. 23 is a flowchart representing the process of producing a memory administrating table.

The following describes the details of the process of producing the memory administrating table 40:

FIG. 23 shows the flow in the process of producing the memory administrating table 40. In response to the report on the memory size to be acquired (Step S501), the memory administrating table producing function 12*a* starts the operation of acquiring the vacant region corresponding to that memory size. To be more specific, the vacant region in the system memory 15 is detected (Step S502), and the memory unit is acquired from the detected vacant region (Step S503).

For example, if the size of the detected vacant region is smaller than the remaining size as a difference between the memory size having been acquired so far and the required memory size, all the detected vacant regions are acquired as a memory unit. If the size of the detected vacant region is greater than the remaining size, the memory region for the remaining size is acquired from the detected vacant region as a memory unit. If the memory unit is acquired according to the fixed length boundary (e.g., 4 K-byte boundary), then the memory region of the size corresponding to an integral multiple of the fixed length of this boundary is acquired as a memory unit from the start position conforming to this boundary in the detected vacant region.

The system produces the memory administrating table 40 registering the information (unit information) of the head address and size of the memory unit having been acquired in the aforementioned manner (Step S504) so as to have the same data structure as that of descriptor table for DMA. If the region for the required memory size cannot be obtained (Step S505: N), the system goes to Step S502, and detects the next vacant region. When the memory unit corresponding to the required memory size (vacant region) is acquired (Step S505: Y), processing completes (END). If the memory unit for the required memory size (vacant region) cannot be acquired, the procedure will end in an error.

Figure 24:
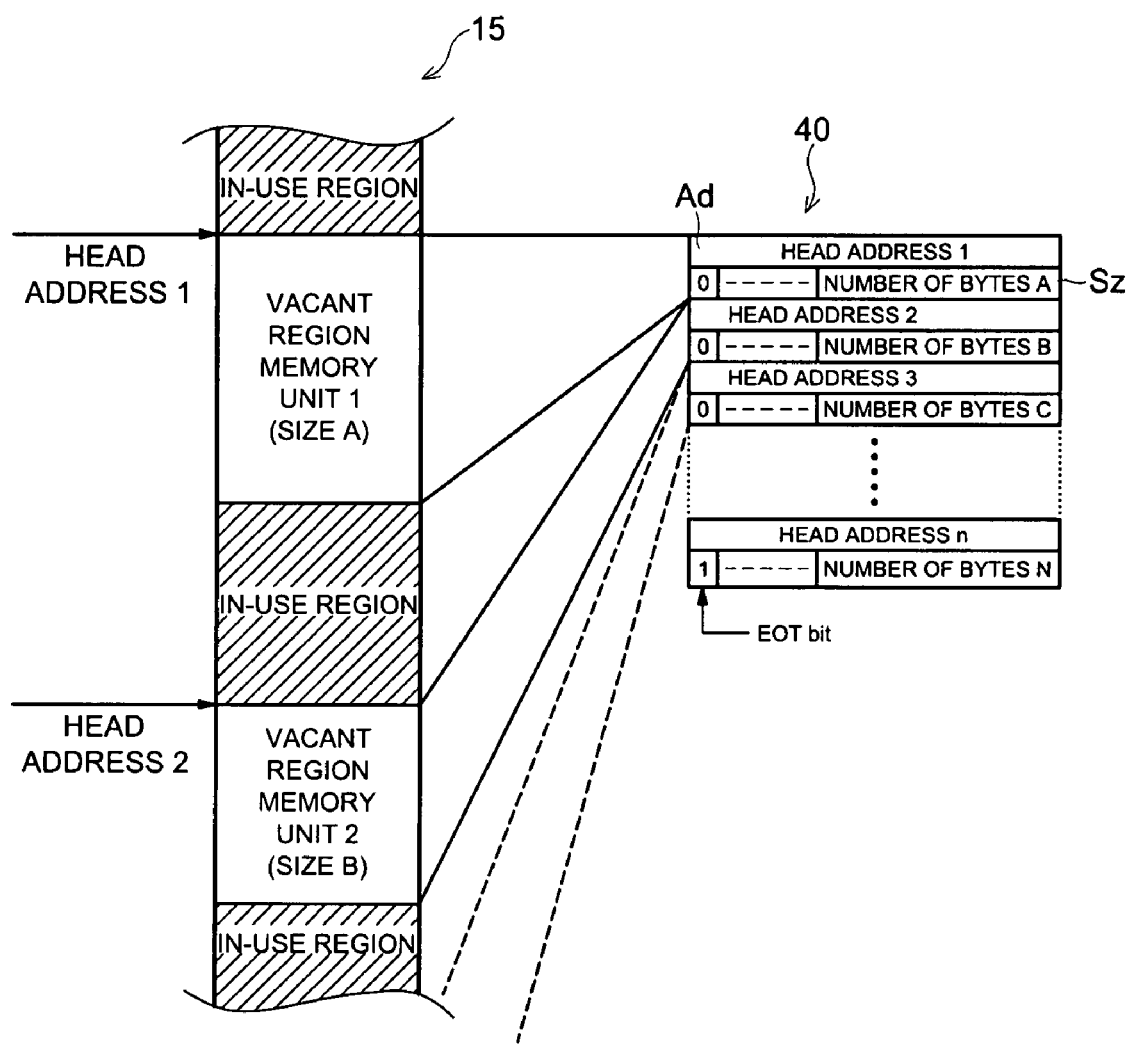
FIG. 24 is an explanatory diagram showing an example of the correspondence between the unoccupied status of the system memory and the produced memory administrating table.

FIG. 24 shows an example of the unoccupied status of the system memory 15 and the produced memory administrating table 40. The system memory 15 contains vacant regions. When a plurality of these discrete vacant regions are added up, the memory unit (memory region) corresponding to the required memory size can be acquired. The unit information including the head address Ad of the memory unit, the region size (the number of bytes) Sz, and the end bit EOT for that table is registered in the memory administrating table 40 in the form of a list for each of the memory units having been acquired. In the end bit EOT, only the unit information at the end of the list is set to "1". Others are set to "0". In the drawings other than FIG. 24, the memory administrating table 40 is shown in a simplified form. The data structure is the same as that shown in FIG. 24.

A memory administrating table 40 to be produced contains the unit information on the memory unit acquired in the manner described above. Thus, by referring to the memory administrating table 40, the system controller 11 can efficiently get the information on the memory region used to store the image data. Further, the memory administrating table 40 to be produced has the same data structure as that of the DMA descriptor table which the DMA controller 24*a* refers to. This allows the memory administrating table 40 to be used as the DMA descriptor table as well. As compared to the method of producing each table separately, this arrangement reduces the load of the processor 12 in creation the table and also reduces the memory size for storing the table, thereby enhancing the efficiency in processing and in the use of the system memory 15. The DMA transfer using the memory administrating table 40 will be described later.

The size of one memory unit is restricted to the level equal to or less than the maximum number of bytes that can be processed by the DMA controller 24*a* in one DMA transfer step. For example, when the maximum number of bytes that can be processed in one DMA transfer step is 64 K bytes and the size of the vacant region detected from the system memory 15 is 80 K bytes, this vacant region is used separately for the memory unit where the size is 64 K bytes and for the memory unit where the size is 16 K bytes. The unit information on each unit is formed in the memory administrating table 40.

Figure 25:
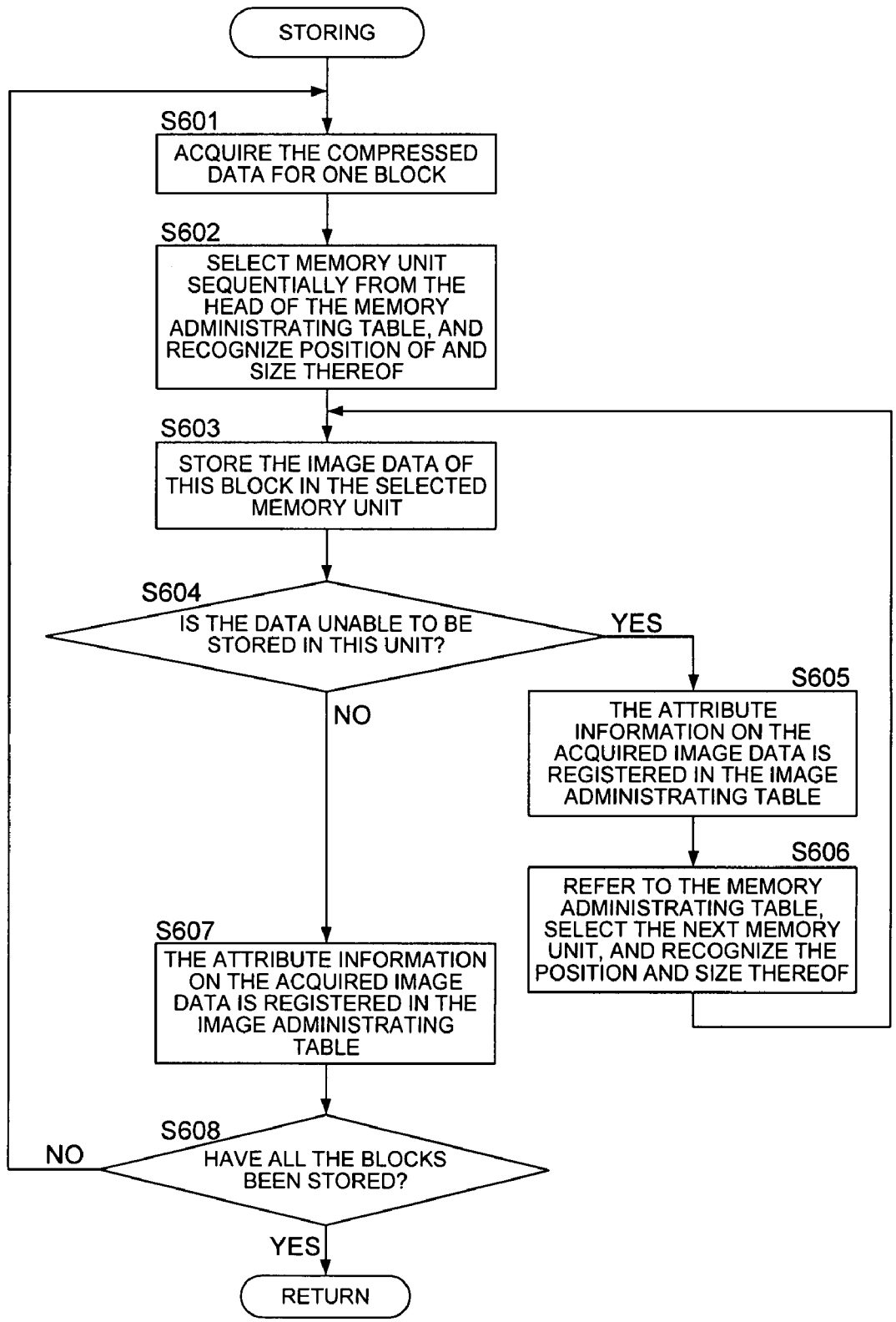
FIG. 25 is a flowchart representing how the 1-block image data compressed by the system image processing section is stored into the system memory.

The following describes the details of the flow in the step of storing the compressed one-block image data in the system memory 15 (Step S409 of FIG. 21):

FIG. 25 shows the flow in the step storing the compressed 1-block image data into the system memory 15. Upon receipt of the one-block image data compression completion report from the system image processing section 16 (Step S601), the system controller 11 refers to the memory administrating table 40 and selects the memory unit sequentially from the top position, whereby the position (head address) and size of the selected memory unit are identified (Step S602).

Reference is made to the image administrating table 50 to be described later, to check if part of the region of the above selected memory unit (part on the stop position) is already used or not. If so, the offset up to the vacant region after the partly used region from the top position can be recognized from the image administrating table 50. The image data of the block corresponding to the preceding compression completion report is stored from the top position of the memory unit or to the back thereof when partly used (Step S603).

If this image data cannot completely be stored in this memory unit (Step S604: Y), the attribute information on the last stored image data last stored in this memory unit is registered in the image administrating table 50 (Step S605). Further, reference is made to the memory administrating table 40, and the next memory unit is selected (Step S306). Then the remaining image data is stored in this memory unit (Step S603).

When the image data up to the last of the relevant block can be stored in this memory unit (Step S604: N), the attribute information on the image data last stored in this memory unit is registered in the image administrating table 50 (Step S607). If there is any block that has not yet stored for the relevant page (Step S608: N), the system goes back to the Step S301 and continues the processing of the next block. Upon completion of storage for all the blocks of one page (Step S608: Y), the system completes this processing (RETURN).

Figure 26:
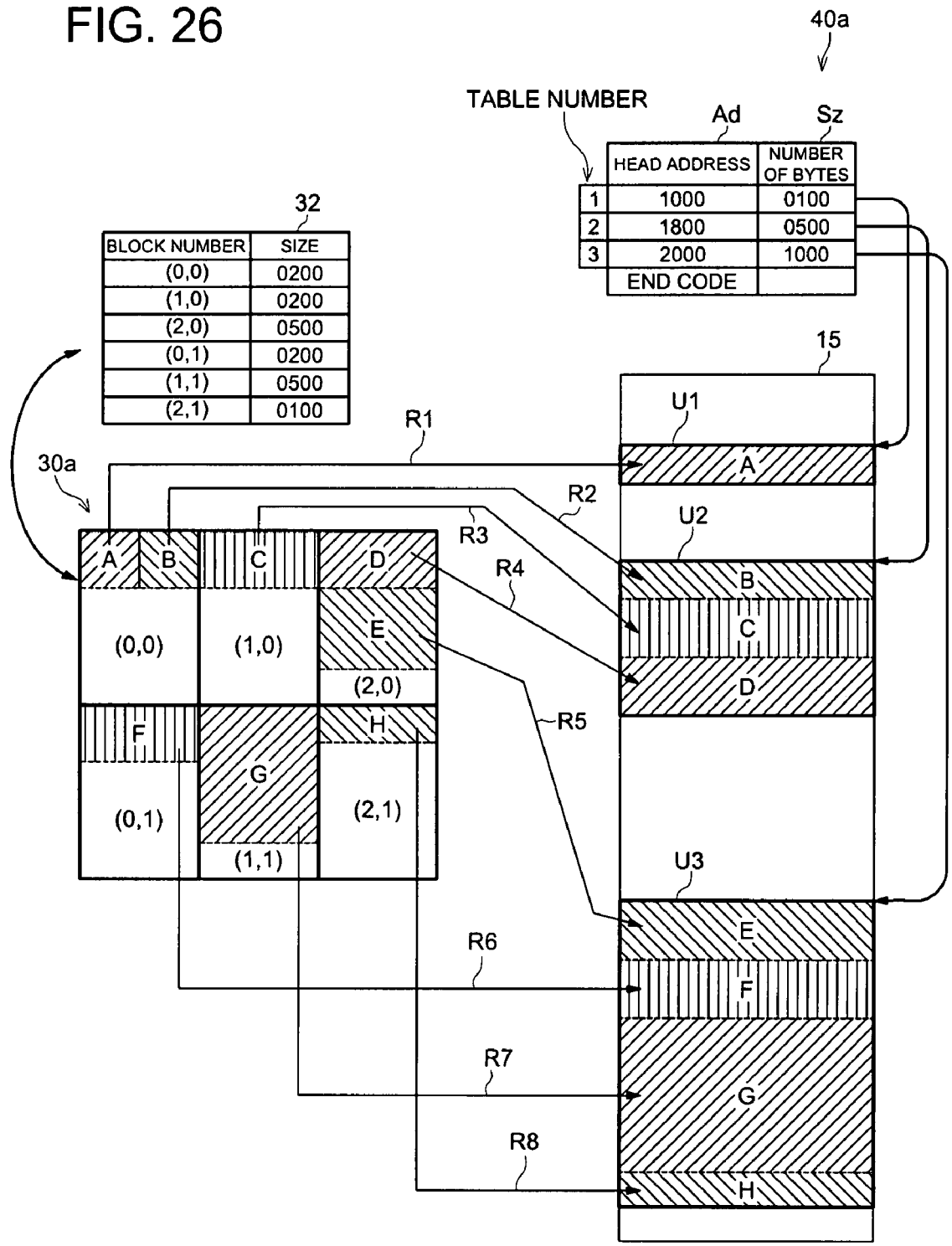
FIG. 26 is an explanatory diagram showing how image data having been divided is stored in a plurality of memory units on the system memory, based on the memory administrating table.

FIG. 26 shows an example of how the one-page image data 30a is divided into six blocks (three blocks in the horizontal direction and two blocks in the vertical direction), and the image data compressed for each block is stored in the system memory 15 based on the memory administrating table 40a.

As shown in the list 32 in the drawing, in this example, the image data of each block is compressed in hexadecimal notation such that the block (0, 0) will be 0200h bytes, block (1, 0) will be 0200h bytes, block (2, 0) will be 0500h bytes, block (0, 1) will be 0200h bytes, block (1, 1) will be 0500h bytes, and block (2, 1) will be 0100h bytes.

The memory administrating table 40a registers the information on the memory unit U1 (head address: 1000h; size: 0100h), memory unit U2 (head address: 1800h; size: 0500h), and memory unit U3 (head address: 2000h; size: 1000h).

Thus, as shown in the list 32, if the storage of compressed image data is performed by the system controller 11 referring to the memory administrating table 40a, the operation will be as follows: The image data of the block (0, 0) subsequent to compression is stored from the top position of the memory unit U1. When the image data (A) of the size of 0100h bytes from the top position has been stored, the memory unit U1 is filled (process R1). The remaining image data (B) is stored in the top position of the next memory unit U2 (R2).

The image data (C) of the block (1, 0) subsequent to compression is stored in the region following the memory unit U2 (R3), and therefore, is completely stored in the memory unit U2. The image data of the block (2, 0) subsequent to compression is stored in the region following the memory unit U2 (R3). When the image data (D) of 0100h bytes from the top position of the block (2, 0) has been stored, the memory unit U2 is filled (R4). The remaining image data (E) is stored at the top position of the memory unit U3 (R5).

Further, the image data (F) of block (0, 1) subsequent to compression, the image data (G) of block (1, 1) subsequent to compression, and the image data (H) of block (2, 1) subsequent to compression are stored in the remaining areas of the memory unit U3 in that order (R6, R7 and R8). This completes the storage of one page.

Figure 27:
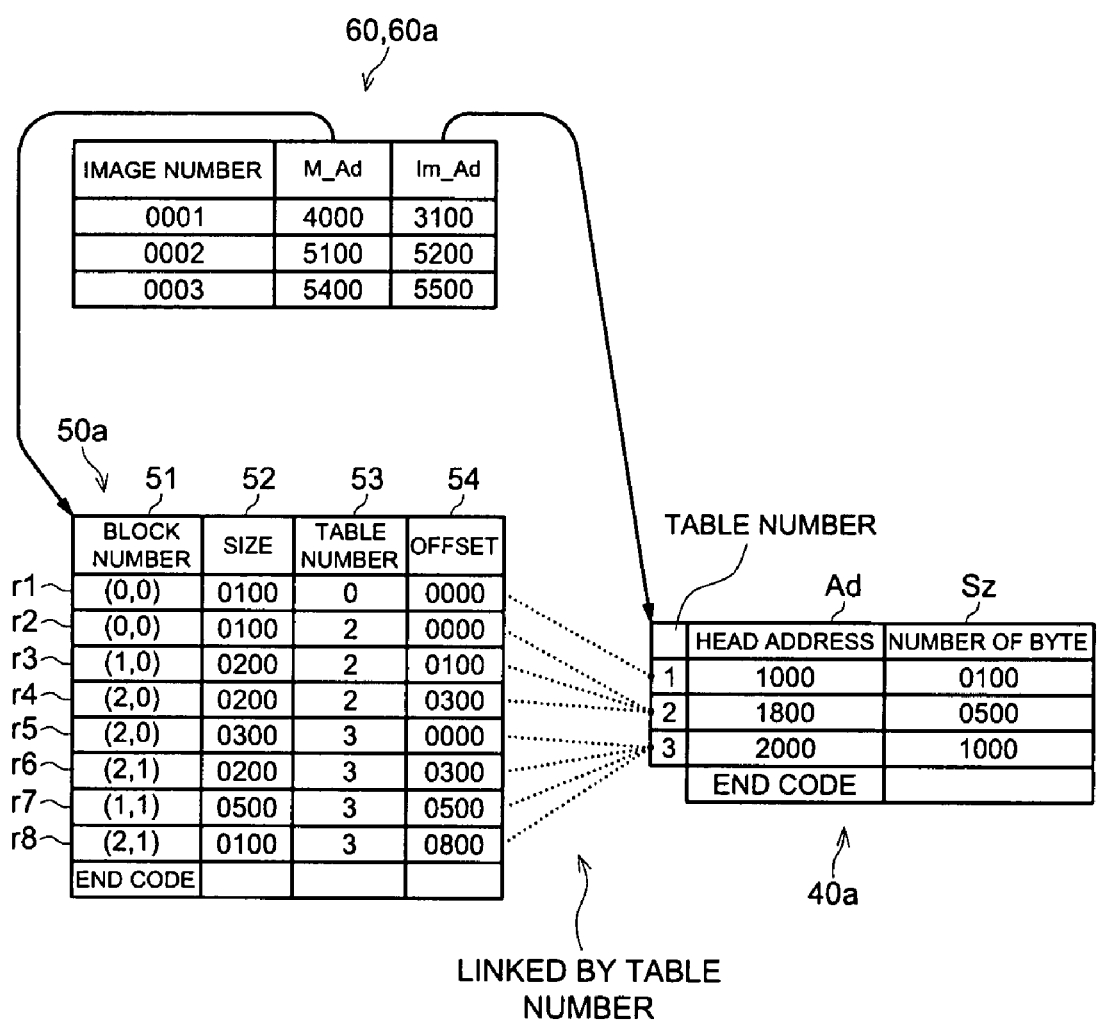
FIG. 27 is an explanatory diagram showing an example of the image administrating table to be produced when the image data is stored, and a memory administrating table and job administrating table associated thereto, as shown in FIG. 8.

FIG. 27 shows the image administrating table 50a produced when the image data has been stored, and the memory administrating table 40a and job administrating table 60a associated thereto, as shown in FIG. 26. The image administrating table 50a registers the attribute information r1 through r8 on the image data stored in one storage operation (each of R1 through R8 of FIG. 26).

What is registered as the attribute information r here includes the block number 51 of the image data, the size information 52 showing the number of bytes of the stored image data, the table number 53 for specifying the memory unit stored in the image data, and the offset information 54 which shows from the position of how many bytes after the top position of the memory unit this image data is stored. The table number 53 shows the ordinal number of the registered unit information as counted from the top position of the relevant memory administrating table 40a. It is the linkage information that links the attribute information r to specific unit information.

For example, the attribute information r1 registered in the first line of the image administrating table 50a of FIG. 27 corresponds to the storage operation R1 of FIG. 26. This shows that the first 0100h bytes (A of FIG. 26) in the image data of the block (0, 0) is stored at the top position of the memory unit U1 corresponding to the table number "1".

The attribute information r2 on the second line corresponds to the storage operation R2 of FIG. 26. It shows that the next 100h bytes (B of FIG. 26) of the image data of the block (0, 0) is stored in the top position of the memory unit U2 corresponding to the table number "2".

Similarly, the attribute information r3 on the third line corresponds to the storage operation R3 of FIG. 26. It shows that 0200h bytes from the top position (C of FIG. 26) in the image data of block (1, 0) are stored at the position offset by 0100h bytes after the top position of the memory unit U2 corresponding to the table number "2".

The memory administrating table 40 and image administrating table 50 each are produced for the one-page image data, and the job administrating table 60 linking these tables with the job is separately produced. The job administrating table 60 registers the page number (image number), the head address (M_Ad) of the memory administrating table 40 of that page, and the head address (Im_Ad) of the image administrating table 50 in the form linked with one another for each page of a job.

The storage positions in the image administrating table 50 and memory administrating table 40 corresponding to each page of the target job can be identified by referring to the job administrating table 60. By referring to the image administrating table 50 and memory administrating table 40, it is possible to identify the positions within the system memory 15 wherein the image data of each block of that page is distributed and stored. Thus, based on the image administrating table 50, the one-page image data stored in a plurality of memory regions in the discrete positions within the system memory 15 can be read out as it is linked with the original one-page image data.

The format of the image administrating table 50 is not restricted to the one shown in FIG. 27. For example, instead of the table number 53, the address information and pointer information directly showing the storage location of the unit information at the reference site may be registered. Further, instead of the table number 53 and offset information 54, the head address of the memory region storing the relevant image data may be directly registered in the image administrating table 50. Further, it is also possible to arrange such a configuration that the job number and page number in the job are registered in the image administrating table 50.

The following describes the procedure by which the image data stored in a plurality of memory regions within the system memory 15 is stored in the large-capacity storage device (HDD) 24.

Figure 28:
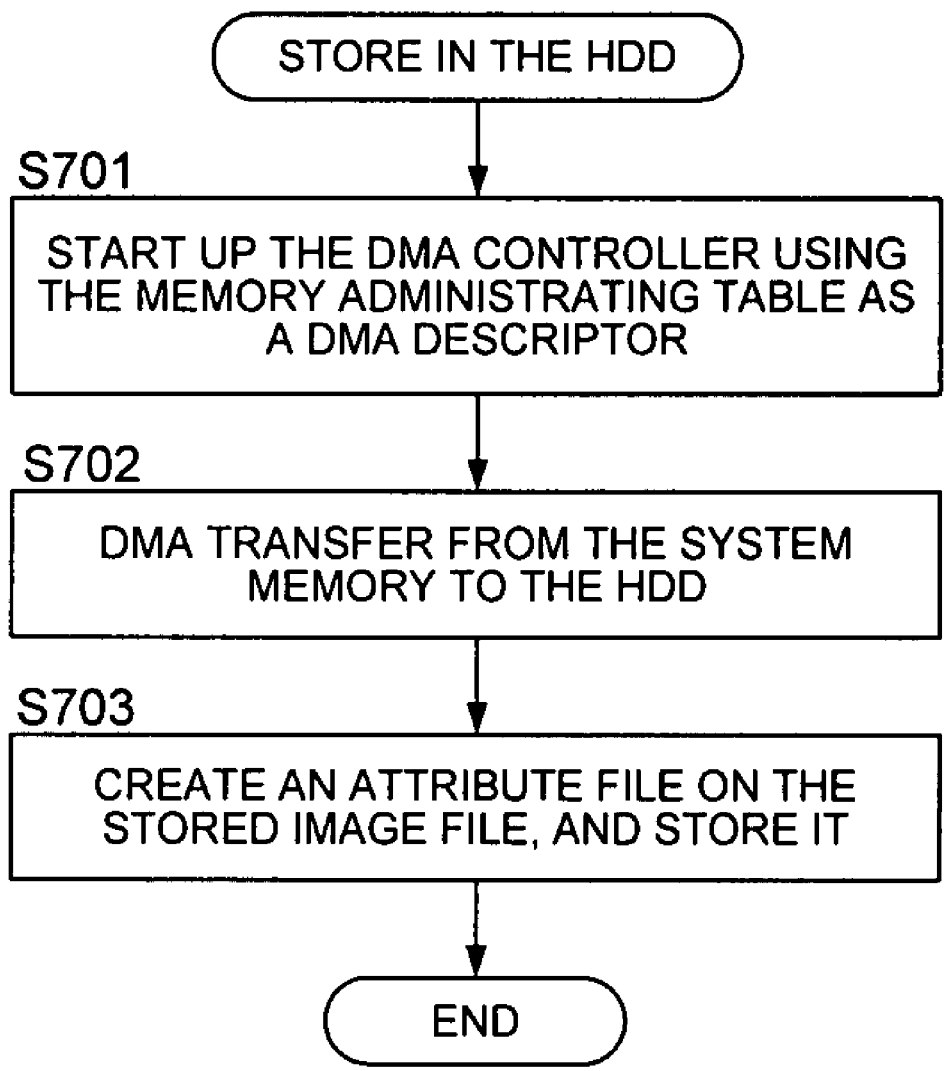
FIG. 28 is a flowchart showing the procedure of storage into a large-capacity storage device (HDD)

FIG. 28 shows the flow in the process of storing the image data of the system memory 15 into the large-capacity storage device (HDD) 24 by DMA transfer. The flow of the command and data on the related operations is given in FIG. 22. After the head address of the memory administrating table 40 linked with the page to be transferred to the large-capacity storage device (HDD) 24 has been reported to the DMA controller 24a, the processor 12 starts up the DMA controller 24a (FIG. 28: Step S701, FIG. 22: P10). The memory administrating table 40 is produced according to the same data structure as that of the DMA descriptor table. Thus, the DMA controller 24a recognizes the memory administrating table 40 as the DMA descriptor table. According to the description of the DMA descriptor table, DMA transfer is executed sequentially from that top position (Step S702 of FIG. 28 and P11 of FIG. 22).

The data having been DMA-transferred according to the DMA descriptor table is stored in the large-capacity storage device (HDD) 24 as a series of image data (one image file 70).

Upon completion of all the DMA transfer described in the memory administrating table 40 (DMA descriptor table), the processor 12 produces the attribute file 80 related to the image file 70 stored in the large-capacity storage device (HDD) 24, based on the image administrating table 50. This is stored in the large-capacity storage device (HDD) 24 (Step S703 of FIG. 28 and P12 of FIG. 22), and the processing then completes (END).

Figure 29:
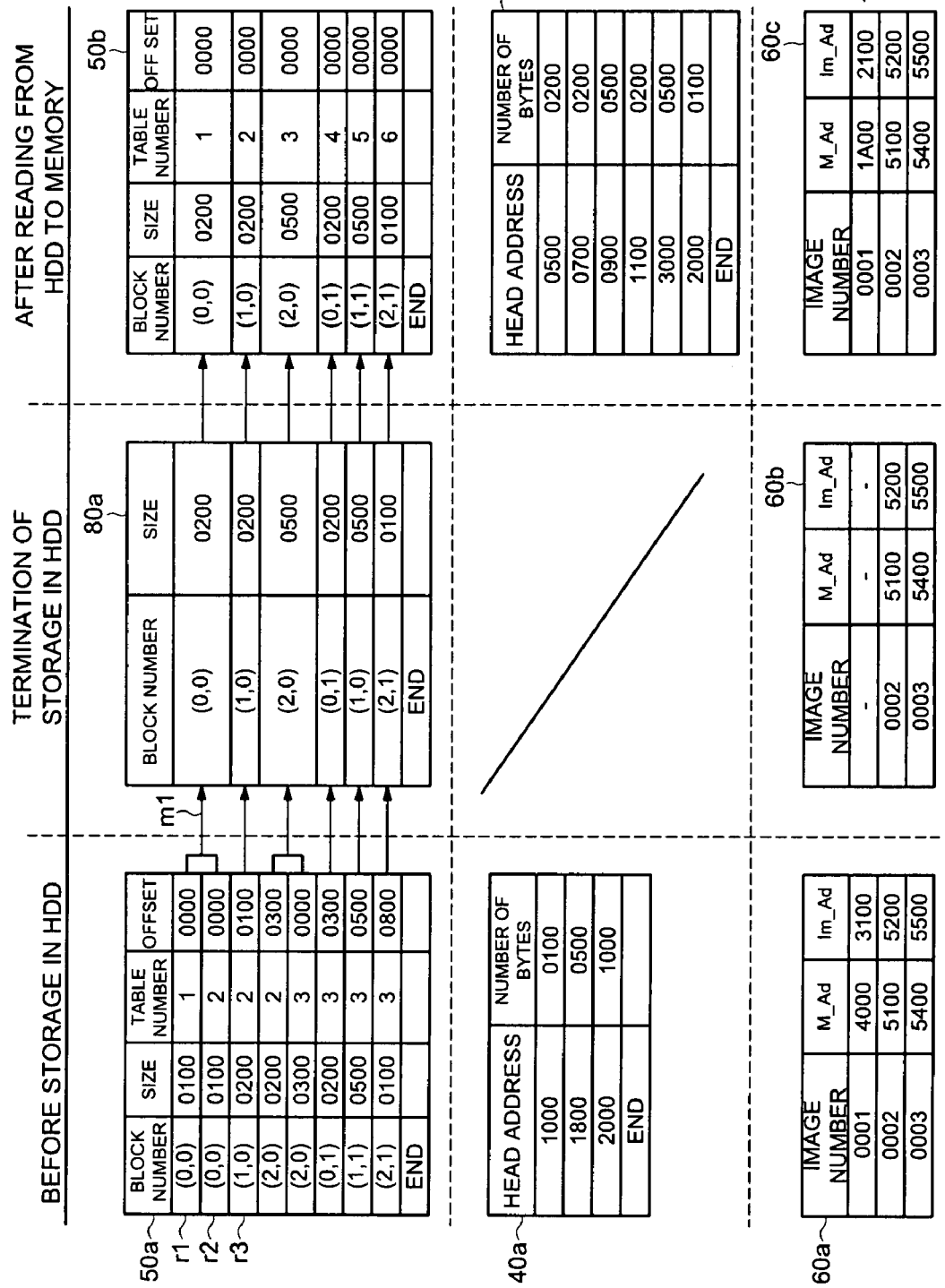
FIG. 29 is an explanatory diagram showing an example of how various tables are registered before and after image data is stored in the large-capacity storage device (HDD)

FIG. 29 shows how various tables are registered before and after image data is stored in the large-capacity storage device (HDD), and after it has been read. It shows the case wherein the image data (image number "0001") stored in the system memory 15 is stored in the large-capacity storage device (HDD) 24 by DMA transfer, as shown in FIG. 26 and FIG. 27. Before the image data is stored in the large-capacity storage device (HDD) 24, the same memory administrating table 40a and image administrating table 50a and job administrating table 60a as those of FIG. 27 are produced.

Upon completion of DMA transfer from the system memory 15 to the large-capacity storage device (HDD) 24, the processor 12 refers to the image administrating table 50a and produces the attribute file 80a. The attribute file 80a registers the block number and size of the block (number of bytes) in the form linked with each other. The processor 12 searches the image administrating table 50a and adds up the sizes registered in the attribute information on the same block number to find out the block size of the block number.

In the example given in FIG. 29, the size of the block (0, 0) is obtained as the sum of the size (0100h) in the attribute information r1 registered in the image administrating table 50a and the size (0100h) in the attribute information r2 (FIG. 29: m1). For the block (1, 0), only one piece of the attribute information r3 is registered in the image administrating table 50a. Accordingly, the size (0200h) in the relevant attribute information r3 is directly registered in the attribute file 80a as the size of the block.

The image data from block (0, 0) to block (2, 1) is registered in the image file 70 as continuous data. Accordingly, the attribute file 80a is produced as the information (block identification information) for identification for each block.

After the image file 70 and attribute file 80 have been stored in the large-capacity storage device (HDD) 24, the relevant memory administrating table 40a and image administrating table 50a are deleted from the system memory 15. Further, each memory region registered in the memory administrating table 40a is released. The information on the stored page (image number "0001" in FIG. 29) is deleted from the job administrating table 60a (see the job administrating table 60b).

Figure 30:
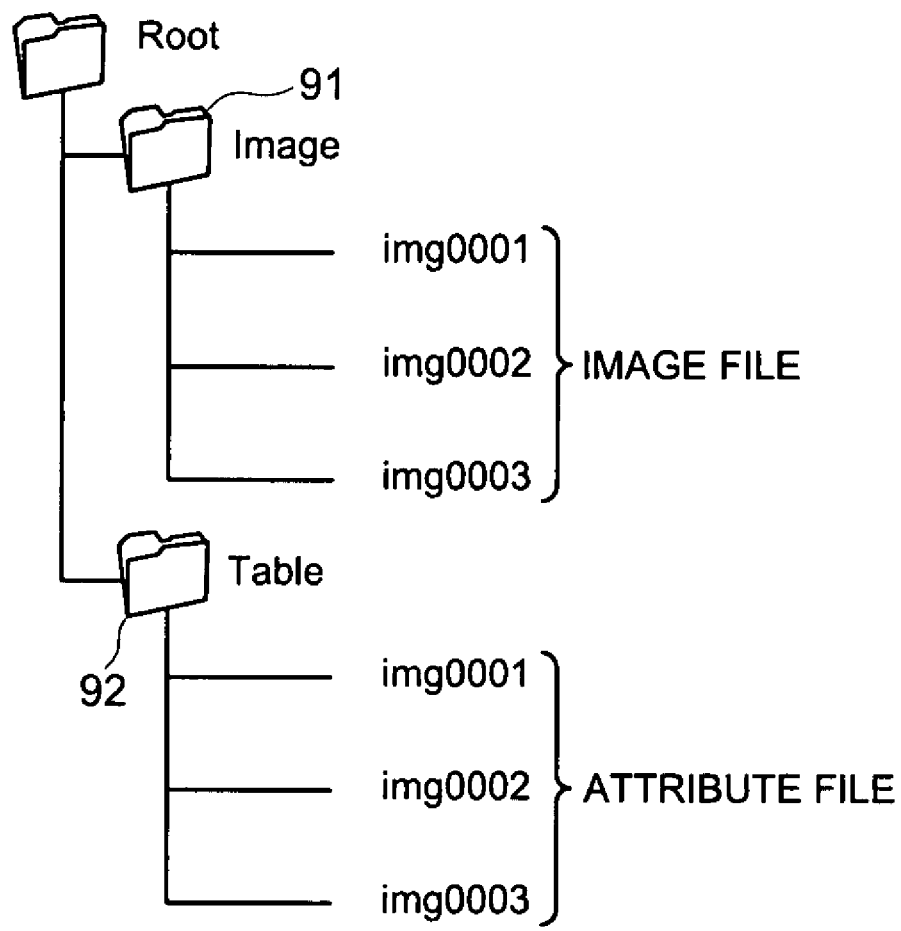
FIG. 30 is an explanatory diagram giving a directory structure to show an example of how the image file and attribute file are stored in the large-capacity storage device (HDD)

In FIG. 30, a directory structure is used to show an example of the image file and attribute file storage status into the large-capacity storage device (HDD) 24. The image file is collectively stored in the image file folder 91, and the attribute file is collectively stored in the attribute file folder 92. The image file and the attribute file corresponding thereto are assigned with the same file name. The file name is used for identification of the correspondence.

Each of the file storage methods is not restricted to the example shown in FIG. 30. For example, the image file and attribute file may be placed in one and the same folder, and an extension may be used for distinction. A folder containing one image file and attribute file linked thereto may be produced for storage for every image file. Any storage method can be used if only the correspondence between the image file and attribute file can be identified.

The following describes the reading procedure ranging from the step of reading the image data stored in the large-capacity storage device (HDD) 24 to the step of storing the image data into the system memory 15.

Figure 31:
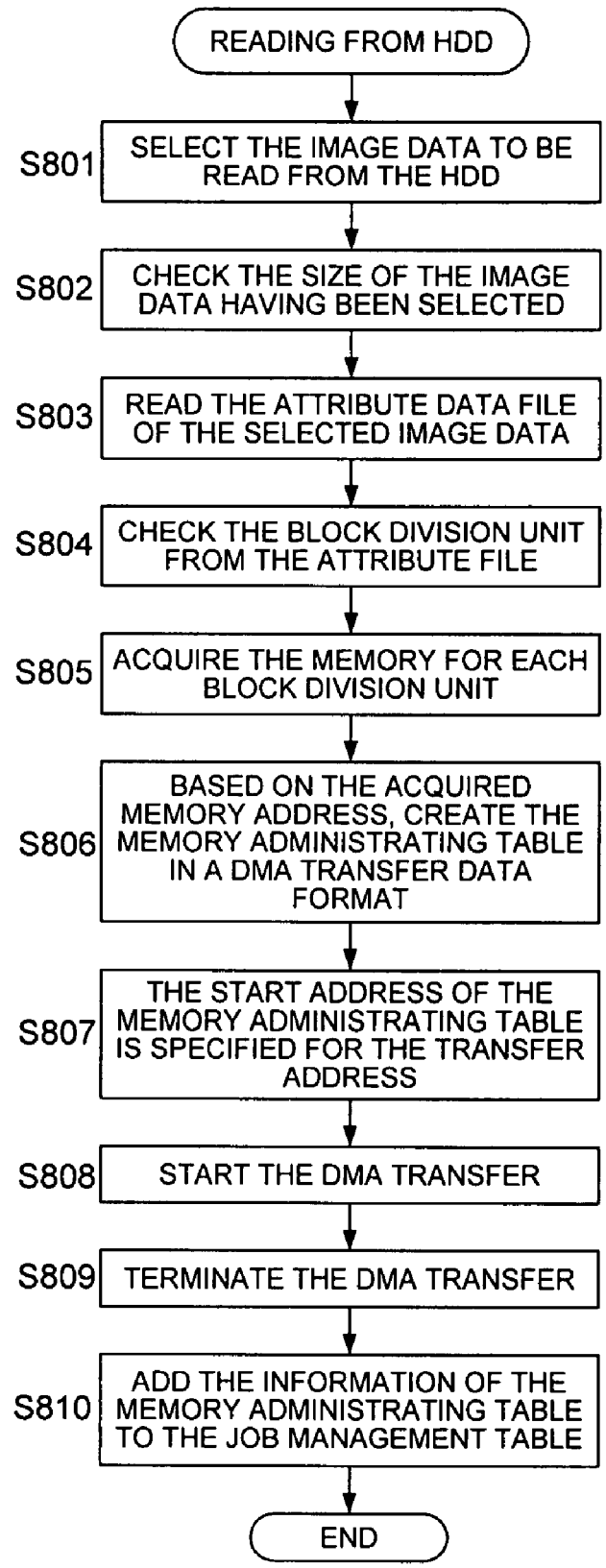
FIG. 31 is a flowchart representing the procedure of reading from the large-capacity storage device (HDD)
Figure 32:
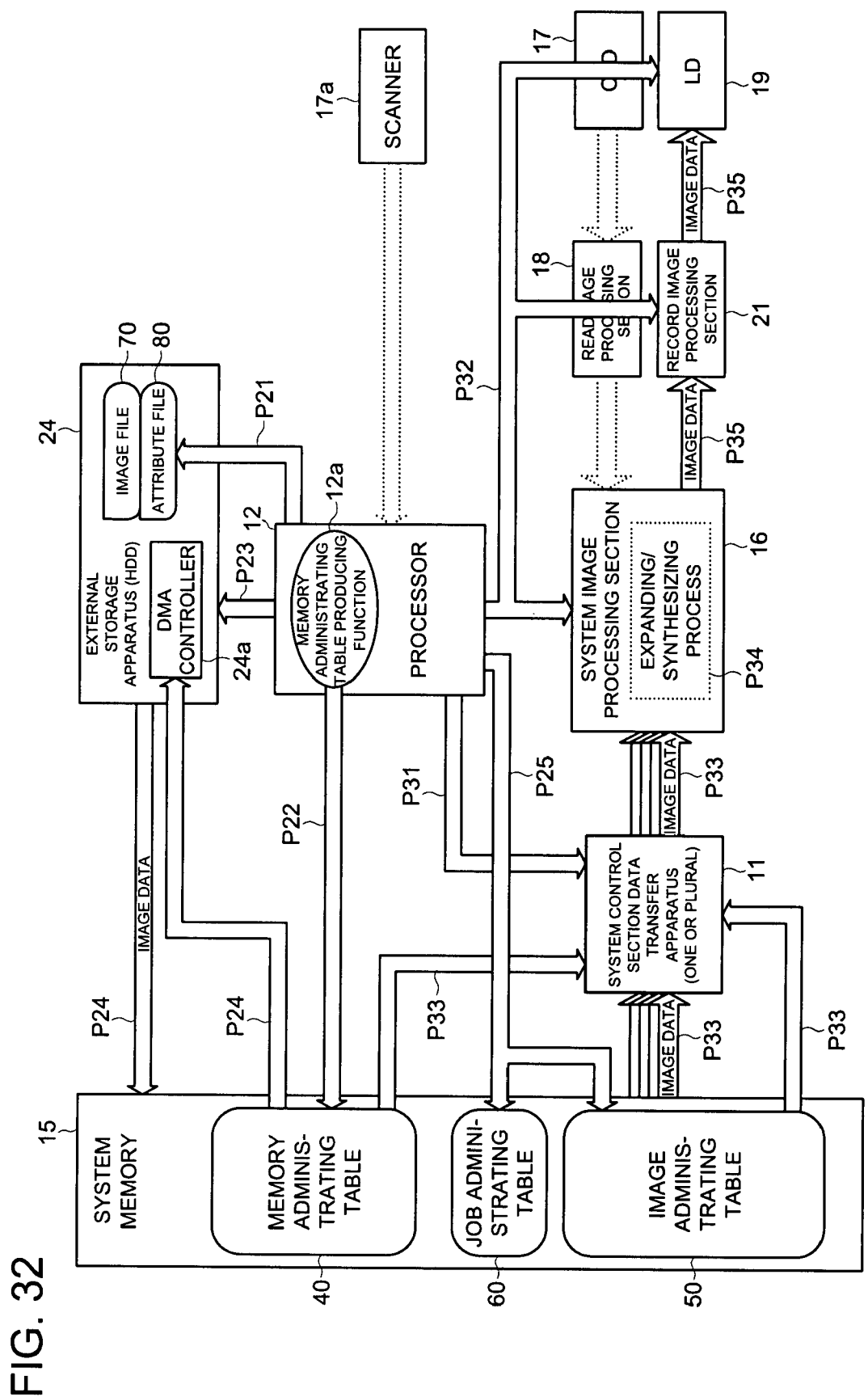
FIG. 32 is an explanatory diagram showing the flow of the command and data in the reading operation of FIG. 13 and the output operation from the system memory.

FIG. 31 shows the flow of the reading operation from the large-capacity storage device (HDD) 24. FIG. 32 shows the flow of the command and data in this processing. In the first place, the processor 12 selects the image file in the large-capacity storage device (HDD) 24 (Step S801) in response to the content of the specified job. After that, the processor 12 checks the size of the image data stored in the image file (Step S802).

Then the attribute file linked with the image file is read (Step S803), and the number of blocks and the size of each block are identified (Step S804 and P21 of FIG. 32). The memory region (memory unit) for storing the image data of these blocks for each block is acquired on the system memory 15 (Step S805), by starting up the memory administrating table producing function 12a. The corresponding memory administrating table 40 is produced in the data structure as that of the DMA descriptor table (Step S806, FIG. 32: P22).

Then the processor 12 reports the head address of the produced memory administrating table 40 to the DMA controller 24a (Step S807), and starts up the DMA controller 24a (Step S808, FIG. 32: P23). The memory administrating table 40 is produced in the same data structure as that of the DMA descriptor table. The DMA controller 24a identifies the memory administrating table 40 as the DMA descriptor table and executes DMA transfer sequentially from the top position in response to the description of this DMA descriptor table. Thus, the image data stored in one image file 70 is stored separately in a plurality of memory units (FIG. 32: P24).

Upon completion of all the DMA transfer operations described in the memory administrating table 40 (DMA descriptor table) (Step S809), the processor 12 produces an image administrating table 50 based on the attribute file 80 linked with the last DMA-transferred image file and the memory administrating table 40. The head address of this image administrating table 50 and the head address of the preceding memory administrating table 40 are registered in the job administrating table 60 (Step S810 and P25 of FIG. 32). Then processing completes (END).

The right side of FIG. 29 shows the image administrating table 50b, memory administrating table 40b and job administrating table 60c that are produced when the image file (image number "0001") corresponding to the attribute file 80a at the center of this drawing is read from the large-capacity storage device (HDD) 24 to the system memory 15. The memory administrating table 40b registers the memory unit corresponding to each of the sizes of the block (0, 0) through block (2, 1) registered in the attribute file 80a. Here each block is stored in one memory unit. Accordingly, the attribute information for each block is produced and registered in the image administrating table 50b. The information 65 on the image number "0001" is additionally registered in the job administrating table 60c.

Figure 33:
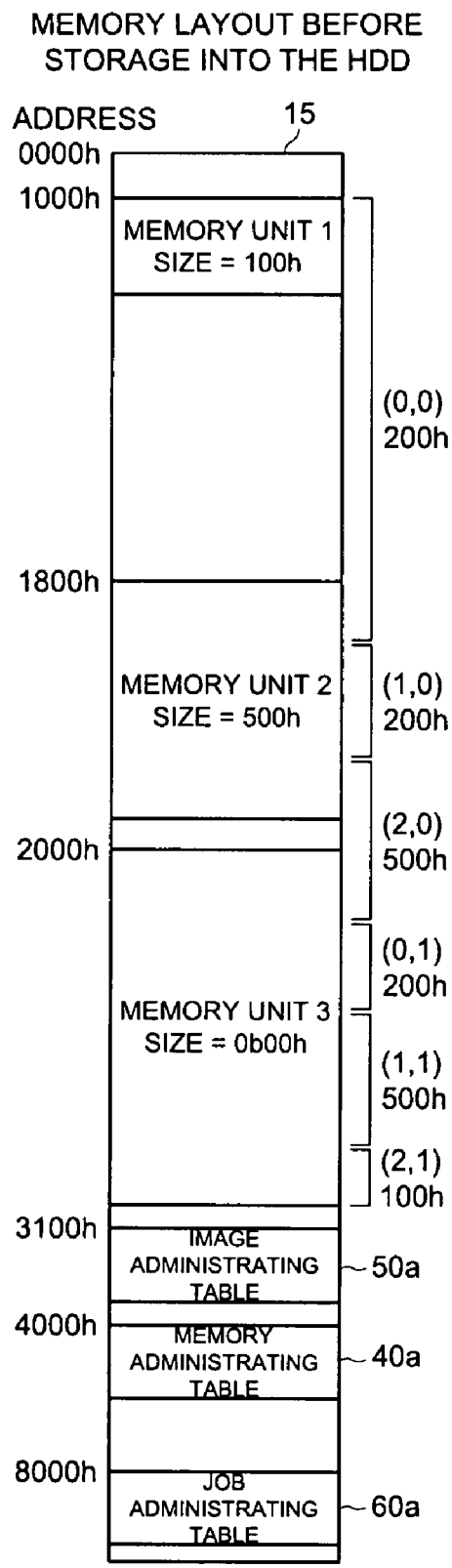
FIG. 33 is an explanatory diagram showing, in contrast to FIG. 11, the layout of the image data and various tables on the system memory before and after image data is stored in the large-capacity storage device (HDD).
Figure 33:
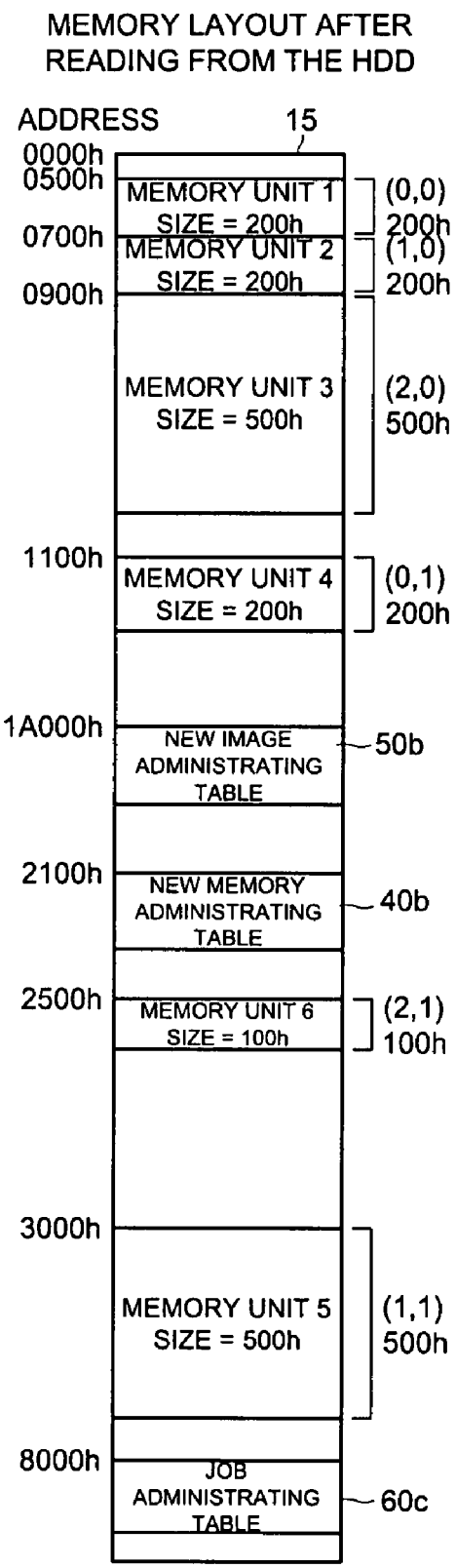

FIG. 33 shows the arrangement of the image data of image number "0001" and the related thereto on the system memory 15 before the data is stored in the large-capacity storage device (HDD) 24 and after it is read out, in the form corresponding to FIG. 29. Before storage in the large-capacity storage device (HDD) 24 ((a) of this figure, one block is stored separately in a plurality of memory units (e.g., block (0, 0) is separately stored in the memory unit 1 and memory unit 2), or the image data of a plurality of blocks is mixedly stored in one memory unit (e.g., block (2, 0), (0, 1), (1, 1) and (2, 1) are mixedly stored in the memory unit 3). However, after having been read out from the large-capacity storage device (HDD) 24 ((b) of the same figure), the image data of one block is stored in one memory unit.

The memory administrating table 40a and image administrating table 50a are once deleted from the system memory 15 when the image data is stored in the large-capacity storage device (HDD) 24. When it is read from the large-capacity storage device (HDD) 24, a new memory region is acquired, and a new memory administrating table 40b and image administrating table 50b are produced. The job administrating table 60 is constantly placed at the same position (8000h in FIG. 33), and only the contents are modified.

As described above, an attribute file 70 is produced at the time of storage into the large-capacity storage device (HDD) 24. This procedure allows the boundary of each block to be identified, and permits the image data to be read out from the large-capacity storage device (HDD) 24. The image data compressed for each block can be decompressed for each block. Further, if the memory region is acquired for each block and is managed according to the image administrating table 50b, each block constitutes a continuous data arrangement on the memory. This facilitates such processing as image rotation, and ensures an efficient operation in subsequent image processing.

If a memory region (memory unit) having a sufficient size to allow continuous storage of one block, the image data of one block can be separately stored into a plurality of memory regions (memory units). In this case, the image data read out of the large-capacity storage device (HDD) 24 should be stored in the same procedure as that for the storage shown in FIG. 25 and FIG. 26.

When the image data read out from the large-capacity storage device (HDD) 24 to the system memory 15 is to be formed into a printed output, the output operation is carried out according to the procedure of P31 through P35 of FIG. 32. To put it in greater details, the information on the head addresses of the memory administrating table 40 and the image administrating table 50 of the page to be outputted, and the presence or absence of rotation of the page are reported to the system controller 11 by the processor 12 (P31). At the same time, the processor 12 starts the system image processing section 16, recorded image processing section 21 and LD 19 P32). The system controller 11 refers to the image administrating table 50 and memory administrating table 40 that have been notified, and identifies the position and size of the memory unit storing the image data. Then the system controller 11 reads out the image data from the memory unit and transfers it to the system image processing section 16 (P33).

Upon completion of transfer of the one-block image data, the system image processing section 16 decompresses the image data to recover the original data before being compressed. The one-block image data having been recovered is located at a predetermined position in the page memory (P34). This processing continues until it completes for all the blocks of one page. When the one-page image data has been obtained in a complete form, this image data is outputted to the LD 19 through the recorded image processing section 21, and is printed on the recording sheet (P35).

The embodiments of the present invention have been described with reference to drawings. It is to be expressly understood, however, that the specific structure of the present invention is not restricted thereto. The present invention can be embodied in a great number of variations with appropriate modification or additions, without departing from the technological spirit and scope of the invention claimed.

For example, in the present embodiment, image data is stored in the system memory. The present invention is effectively used in cases wherein it is difficult to acquire a large vacant region at all times to store image data, and data must be separately stored in discrete vacant regions. In this case, the memory other than the system memory can be used as a memory for storing image data.

The image data division status of FIG. 2 and FIG. 14 is given only to show an example. The size of the block for division or the number of blocks for division can be determined adequately. Further, in the embodiment, independently of the status of acquiring the memory region, after the image data is divided into a plurality of blocks in advance, each block is stored in the memory. However, when image data is not compressed, image data can be acquired in conformity to the size of the acquired memory region.

The information to be registered in the image administrating table is not restricted to that illustrated in the embodiment. The only requirement is the inclusion of at least the information which ensures that the image data separately stored in a plurality of memory regions is linked and recovered to the original status. However, it is also possible to arrange such a configuration that the job number and page number are managed at other than the image administrating table, and the information for management of the job number and page number is linked with the image administrating table corresponding to the job number and page number.

In the embodiment, when image data is stored, a standard memory region is acquired. If the memory region is insufficient during the storage of image data, a new region is added for acquisition. However, it is also possible to arrange such a configuration that a sufficient size of the memory region is provided in the beginning, and the remaining portion is released later.

In the second embodiment, a script engine 16e and DMA transfer section 16d are provided in the system image processing section 16. However, the script engine 16e and DMA transfer section 16d can be provided in the device other than the system image processing section 16. For example, the system controller 11 may be provided with these functions.

The data configuration of the script file is not restricted to that illustrated in the embodiment. For example, the image data division status can be represented by the information that uses the position of diagonal vertex of each block to show it. If it has been determined that the image data is to be divided into uniform size, then arrangements can be made in such a way that the number of divisions in the horizontal and vertical directions as well as the sizes of the image data in the horizontal and vertical directions are described.

The script file, memory administrating table and image administrating table can be stored in a memory other than the system memory. It is sufficient only if they are accessible from a required device.

In the embodiment, when the image data read from a scanner is stored in the system memory 15, a standard memory region is provided. If the memory region is insufficient during the storage of image data, a new region is added for acquisition. However, it is also possible to make such arrangements that a sufficient size of the memory region is provided in the beginning, and the remaining portion is released later. In the aforementioned embodiment, a large capacity storage device 24 is incorporated in the image processing apparatus 10. Without being restricted thereto, the present invention is applicable to a system wherein the large capacity storage device 24 and image processing apparatus 10 are connected.

What is claimed is:

1. An image processing apparatus, comprising:
   a memory;
   a store control section to divide and store image data in plural vacant memory regions in the memory, the store control section comprising:
      an image processing section to divide the image data into plural blocks of image data with a predetermined size and respective positions in the image data;
      a memory administrating table producing section to acquire plural vacant memory regions to store the plural blocks of image data and to produce a memory administrating table to register the acquired vacant memory regions with information indicating at least respective memory sizes and respective positions located in the memory; and
      a control section to store the plural blocks of image data separately into the plural vacant memory regions by referring the memory administrating table; and
   an image administrating information registering section to produce an image administrating table to register the plural blocks of image data divided by the store control section, by correlating the respective positions of the plural blocks of image data located in the image data before dividing the image data with respective stored positions of the plural blocks of image data, the stored positions indicating positions of storing memory regions in the memory.

2. The image processing apparatus described in claim 1, wherein the image administrating information registering section registers attribute information of the image data in the image administrating table, and wherein the attribute information includes the stored positions of the plural blocks of image data indicating the positions of the storing memory regions in the memory.

3. The image processing apparatus described in claim 1, wherein the respective positions of the plural blocks of image data and the respective stored positions of the plural blocks of image data are linked between the memory administrating table and the image administrating table.

4. The image processing apparatus described in claim 2, wherein the attribute information regarding the image data further includes job information and page information with regard to the image data.

5. The image processing apparatus described in claim 1, wherein the control section conducts DMA transfer for image data between the image processing section and the memory by referring a script file describing information regarding the DMA transfer and the memory administrating table.

6. The image processing apparatus described in claim 5, wherein a dividing state of image data by the image processing section is described in the script file.

7. The image processing apparatus described in claim 5, wherein the image processing section divides the image data into plural blocks of M divisions in a horizontal direction and N divisions in a vertical direction in which M and N are positive integers and at least one of M and N is 2 or more, and
   wherein in the script file, information capable of recognizing a start position and the number of pixels in the horizontal direction for each block and a start position and the number of pixels in the vertical direction for each block and the number of usable DMA channels are described.

8. The image processing apparatus described in claim 5, wherein DMA channels to handle each block are fixedly assigned for each block.

9. The image processing apparatus described in claim 5, wherein a vacant DMA channel which has completed a DMA transfer is assigned to conduct a next DMA transfer.

10. The image processing apparatus described in claim 5, wherein each time when a DMA transfer has been completed, attribute information regarding image data transferred by the DMA transfer is registered in the image administrating table.

11. The image processing apparatus described in claim 1, wherein the memory is administrated by a memory administrating system to conduct acquisition and release of a memory region.

12. The image processing apparatus described in claim 1, wherein the divided image data are compressed for each divided unit and the compressed image data are stored in the memory.

* * * * *